(12) United States Patent
Park et al.

(10) Patent No.: US 11,314,476 B2
(45) Date of Patent: Apr. 26, 2022

(54) DISPLAY APPARATUS

(71) Applicant: SAMSUNG ELECTRONICS CO., LTD., Suwon-si (KR)

(72) Inventors: Kwangbok Park, Suwon-si (KR); Mingyu Yoon, Suwon-si (KR); Jongbae Kim, Suwon-si (KR); Sungha Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/115,995

(22) Filed: Dec. 9, 2020

(65) Prior Publication Data
US 2021/0200504 A1  Jul. 1, 2021

(30) Foreign Application Priority Data

Dec. 31, 2019 (KR) .......................... 10-2019-0179853

(51) Int. Cl.
*G06F 3/16* (2006.01)
*G06F 1/16* (2006.01)
(Continued)

(52) U.S. Cl.
CPC .............. *G06F 3/16* (2013.01); *G06F 1/1605* (2013.01); *G06F 1/181* (2013.01); *H04R 1/028* (2013.01); *H04R 5/02* (2013.01); *H04R 2499/15* (2013.01)

(58) Field of Classification Search
CPC .......... G06F 3/16; G06F 1/1605; G06F 1/181; H04R 1/028; H04R 5/02; H04R 2499/15
See application file for complete search history.

(56) References Cited

U.S. PATENT DOCUMENTS 7,433,483 B2  10/2008  Fincham
7,796,772 B2   9/2010  Takahashi et al.
(Continued)

FOREIGN PATENT DOCUMENTS

CN    108616791 A    10/2018
JP    2011-87146 A    4/2011
(Continued)

OTHER PUBLICATIONS

International Search Report (PCT/ISA/210) issued by the International Searching Authority in International Application No. PCT/KR2020/019284, dated Apr. 19, 2021.
(Continued)

*Primary Examiner* — Andrew L Sniezek
(74) *Attorney, Agent, or Firm* — Sughrue Mion, PLLC

(57) ABSTRACT

A display apparatus includes a rear cover behind a display panel, a left cover on a left side of the display panel and a right cover on a right side of the display panel and connected to the rear cover, and a left speaker adjacent to the left cover and a right speaker and the right cover where each of the left speaker and the right speaker includes a diaphragm facing the rear cover and spaced apart from the rear cover to form a slot, an enclosure surrounding a speaker driver, a sound discharge port at one end of the slot adjacent to the left cover or the right cover and through which sound reproduced by the diaphragm is discharged, and a side wall between one surface of the enclosure and the rear cover and surrounding a circumference of the diaphragm excluding the sound discharge port.

17 Claims, 20 Drawing Sheets

(51) Int. Cl.
  *H04R 1/02* (2006.01)
  *H04R 5/02* (2006.01)
  *G06F 1/18* (2006.01)

(56) References Cited

U.S. PATENT DOCUMENTS

| | | |
|---|---|---|
| 9,148,713 B2 | 9/2015 | Miyamoto et al. |
| 10,136,203 B2 | 11/2018 | Hirayama et al. |
| 10,863,268 B1 * | 12/2020 | Torigoe ............... H04R 1/24 |
| 11,109,144 B2 | 8/2021 | Park et al. |
| 2005/0047617 A1 | 3/2005 | Lee |
| 2007/0274547 A1 | 11/2007 | Ueno |
| 2011/0188678 A1 | 8/2011 | Lee et al. |
| 2013/0279730 A1 | 10/2013 | Tanaka |
| 2014/0029779 A1 | 1/2014 | Yamauchi et al. |
| 2017/0262073 A1 | 9/2017 | Jung |
| 2019/0182573 A1 * | 6/2019 | Shin ............... H04R 7/045 |
| 2019/0349657 A1 | 11/2019 | Lin et al. |

FOREIGN PATENT DOCUMENTS

| | | |
|---|---|---|
| KR | 10-2008-0017908 A | 2/2008 |
| KR | 10-2012-0081791 A | 7/2012 |
| KR | 10-2017-0106046 A | 9/2017 |
| KR | 10-1903398 B1 | 10/2018 |

OTHER PUBLICATIONS

Written Opinion (PCT/ISA/237) issued by the International Searching Authority in International Application No. PCT/KR2020/019284, dated Apr. 19, 2021.

\* cited by examiner

DISPLAY APPARATUS

CROSS-REFERENCE TO RELATED APPLICATIONS

This application is based on and claims priority under 35 U.S.C. § 119 to Korean Patent Application No. 10-2019-0179853, filed on Dec. 31, 2019, in the Korean Intellectual Property Office, the disclosure of which is incorporated by reference herein in its entirety.

BACKGROUND

1. Field

The disclosure relates to a display apparatus including a slim speaker.

2. Description of the Related Art

In recent years, in display apparatuses such as televisions, monitors, and the like, a design in which the size of a display panel on which an image is displayed is as large as possible while the thickness of the display apparatus is as thin as possible is applied.

In a display apparatus having such a design, a speaker that reproduces sound is provided to emit sound to the outside while the speaker is hidden inside the display apparatus.

For example, as illustrated in FIG. 1, a display apparatus 100 may be designed so that speakers 110 are not visible in front of the display apparatus 100 by disposing the speaker 110 at the bottom of the rear side of the display apparatus 100. In this case, a diaphragm of a speaker driver 111 is provided to emit sound toward the floor surface on which the display apparatus 100 is disposed. In other words, the speaker driver 111 is disposed in a structure that performs down firing.

However, this design has a problem that the thickness of the display apparatus 100 may not be thinner than the width of the diaphragm of the speaker driver 111. When the width of the diaphragm is reduced to reduce the thickness of the display apparatus 100, the volume of the speaker driver 111 may decrease and the reproduction band of the low-frequency may be reduced.

In order to solve these problems, as in the display apparatus 200 shown in FIG. 2, a slot-loading loudspeaker 210 in which a diaphragm of a speaker driver 211 is disposed parallel to a display panel 201 and sound reproduced by the speaker driver 211 is emitted downwardly through a waveguide has been proposed.

The slot-loading loudspeaker 210 according to the related art may reduce the thickness of the display apparatus 200 than that of the display apparatus 100 having the speaker 110 that outputs sound downward.

However, in the case of the slot-loading loudspeaker 210, because a reflective plate 212 facing the diaphragm of the speaker driver 211 and forming a slot is spaced by a predetermined distance from the diaphragm and a certain gap exists between the reflective plate 212 and a rear cover 203 of the display apparatus 200, the reflective plate 212 and the rear cover 203 form a stacked structure. Accordingly, there is a limit in reducing the thickness of the display apparatus 200 having the slot-loading loudspeaker 210 according to the related art.

SUMMARY

Embodiments of the disclosure overcome the above disadvantages and other disadvantages not described above. In addition, the disclosure is not required to overcome the disadvantages described above, and an embodiment of the disclosure may not overcome any of the problems described above.

The disclosure may provide a display apparatus capable of reproducing clear high-frequency sound and reducing thickness thereof.

In addition, the disclosure may provide a display apparatus capable of reproducing clear high-frequency sound, improving a sense of vertical presence, having a high low-frequency volume and low-frequency reproduction band, and reducing thickness thereof.

According to an aspect of the disclosure, a display apparatus may include a rear cover disposed behind a display panel and formed to cover a rear surface of the display panel, a left cover disposed on a left side of the display panel and connected to the rear cover and a right cover disposed on a right side of the display panel and connected to the rear cover, and a left speaker disposed adjacent to the left cover and a right speaker disposed adjacent to the right cover where each of the left speaker and the right speaker may include a diaphragm facing the rear cover and spaced apart from the rear cover to form a slot, an enclosure surrounding a speaker driver, a sound discharge port provided at one end of the slot adjacent to the left cover or the right cover and through which sound reproduced by the diaphragm is discharged, and a side wall disposed between one surface of the enclosure and the rear cover and configured to surround a circumference of the diaphragm excluding the sound discharge port.

Each of the left cover and the right cover may include an opening that is formed at a portion facing the sound discharge port and has a length and a width, The opening may be formed as a plurality of holes.

The rear cover may include a rear opening that is formed at a portion corresponding to the sound discharge port, is adjacent to the left cover or the right cover, and has a length in a vertical direction and a width in a horizontal direction.

The rear opening may be formed as a plurality of holes.

Each of the left speaker and the right speaker may further include a sound absorbing member disposed on the side wall.

Each of the left speaker and the right speaker may include a full-range speaker.

Each of the left speaker and the right speaker may include a mid-range speaker and a tweeter.

The display apparatus may further include a woofer speaker disposed between the rear cover and the display panel, and the rear cover may include a woofer opening through which a diaphragm of the woofer speaker is exposed.

The display apparatus may further include at least one passive radiator provided at one side of the woofer speaker, and the rear cover may further include at least one radiator opening corresponding to the at least one passive radiator.

The woofer speaker may include a left woofer speaker disposed close to the left cover and a right woofer speaker disposed close to the right cover, and each of the left woofer speaker and the right woofer speaker may include at least one passive radiator.

The display apparatus may further include an upper cover disposed above the display panel and connected to the rear cover and an upper left speaker and an upper right speaker disposed under the upper cover and spaced apart from each other in a horizontal direction, and the upper cover may include two upper openings through which sounds reproduced by the upper left speaker and the upper right speaker are discharged.

Each of the upper left speaker and the upper right speaker may include a diaphragm facing the rear cover and spaced apart from the rear cover to form a slot, an upper enclosure surrounding an upper speaker driver, an upper sound discharge port provided to face the upper opening at one end of the slot adjacent to the upper cover and through which sound reproduced by the diaphragm is discharged, and an upper side wall disposed between one surface of the upper enclosure and the rear cover and configured to surround a circumference of the diaphragm excluding the upper sound discharge port.

The rear cover may include upper rear openings formed at portions of the rear cover corresponding to the upper sound discharge ports of the upper left speaker and the upper right speaker.

The display apparatus may further include a front cover configured to support the display panel and the left cover and the right cover may be formed integrally with the front cover.

According to another aspect of the disclosure, a display apparatus may include a rear cover disposed behind a display panel and formed to cover a rear surface of the display panel, a left cover disposed on a left side of the display panel and connected to the rear cover and a right cover disposed on a right side of the display panel and connected to the rear cover, a left speaker disposed adjacent to the left cover and a right speaker disposed adjacent to the right cover, an upper cover disposed above the display panel and connected to the rear cover, and an upper left speaker and an upper right speaker disposed under the upper cover where each of the left speaker, the right speaker, the upper left speaker, and the upper right speaker may include a diaphragm facing the rear cover and spaced apart from the rear cover by a predetermined distance to form a slot, an enclosure surrounding a speaker driver, a sound discharge port provided at one end of the slot and through which sound reproduced by the diaphragm is discharged, and a side wall disposed between one surface of the enclosure and the rear cover and configured to surround a circumference of the diaphragm excluding the sound discharge port.

The display apparatus may further include a woofer speaker disposed between the rear cover and the display panel, and the rear cover may include a woofer opening through which a diaphragm of the woofer speaker is exposed.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION

Figure 1:
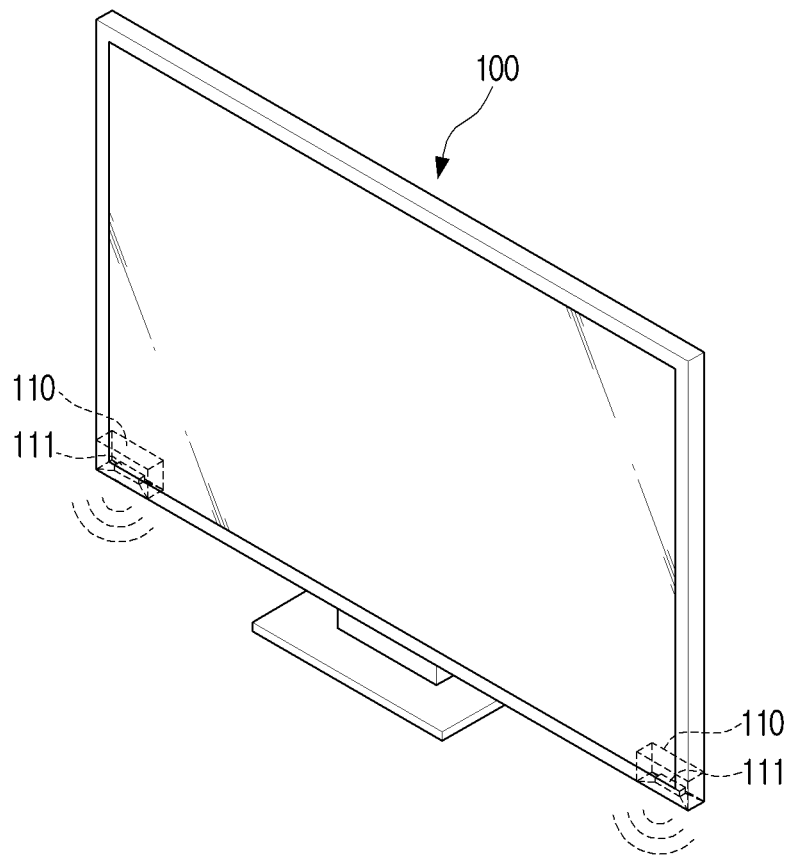
FIG. 1 is a perspective view illustrating a display apparatus according to the related art including speakers arranged in a downward output structure.
Figure 2:
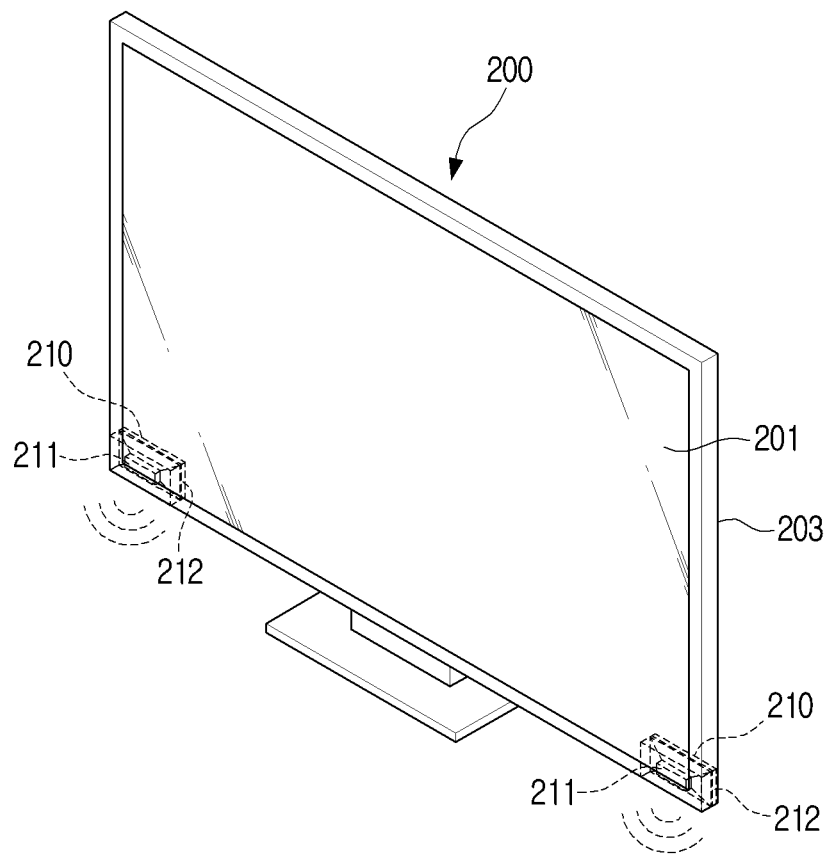
FIG. 2 is a perspective view illustrating a display apparatus according to the related art with slot-loading loudspeakers.

Hereinafter, certain embodiments of the disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

To sufficiently understand configurations and effects of the disclosure, embodiments of the disclosure are described with reference to the accompanying drawings. However, the disclosure is not limited to the embodiments to be described below, but may be implemented in several forms and may be variously modified. A description for these embodiments is provided only to make the disclosure complete and allow those skilled in the art to which the disclosure pertains to completely recognize the scope of the disclosure. In the accompanying drawings, sizes of components may be enlarged as compared with actual sizes for convenience of explanation, and ratios of the respective components may be exaggerated or reduced.

It is to be understood that if one component is described as being "on" or "in contact with" another component, it may be in direct contact or connection with another component, or be in contact or connection with another component having other component interposed therebetween. To the contrary, if one component is described as being "directly on" or "in direct contact with" another component, it is to be understood that there is no other component interposed therebetween. Other expressions that describe the relationship between the components, for example, "between" and "directly between" may be interpreted in the same way.

Terms such as 'first', 'second' and the like, may be used to describe various components, but the components are not to be interpreted to be limited to the terms. These terms may be used to differentiate one component from other components. For example, a 'first' component may be named a 'second' component and the 'second' component may also be similarly named the 'first' component, without departing from the scope of the disclosure.

Singular forms are intended to include plural forms unless the context clearly indicates otherwise. It may be interpreted that terms "include", "have" or the like, specify the presence of features, numerals, steps, operations, components, parts or a combination thereof mentioned in the present specification, but do not preclude the addition of one or more other features, numerals, steps, operations, components, parts or a combination thereof.

Terms used in the embodiments of the disclosure may be interpreted as the same meanings as meanings that are generally known to those skilled in the art unless defined otherwise.

Hereinafter, a display apparatus 1 according to an embodiment of the disclosure will be described in detail with reference to FIGS. 3 and 4.

Figure 3:
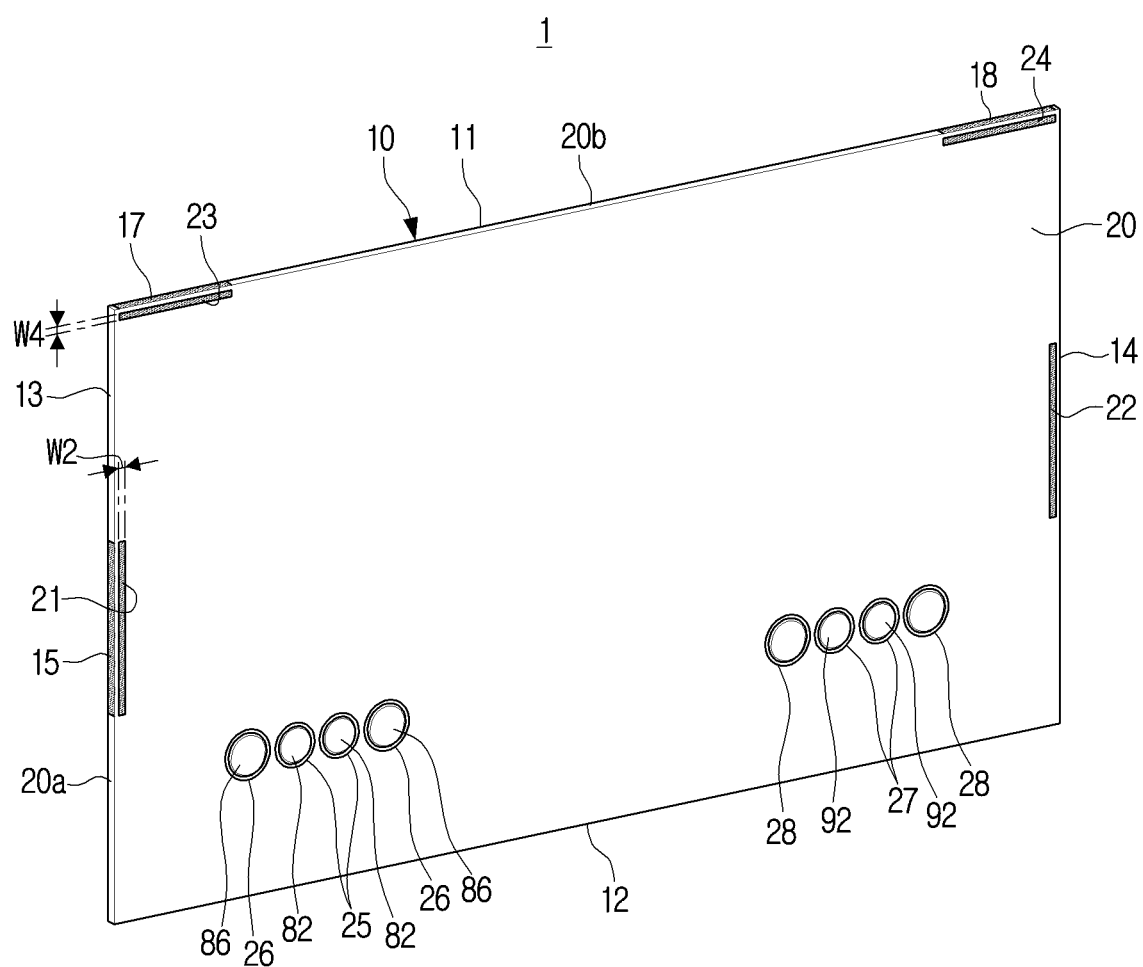
FIG. 3 is a rear perspective view illustrating a display apparatus according to an embodiment of the disclosure.
Figure 4:
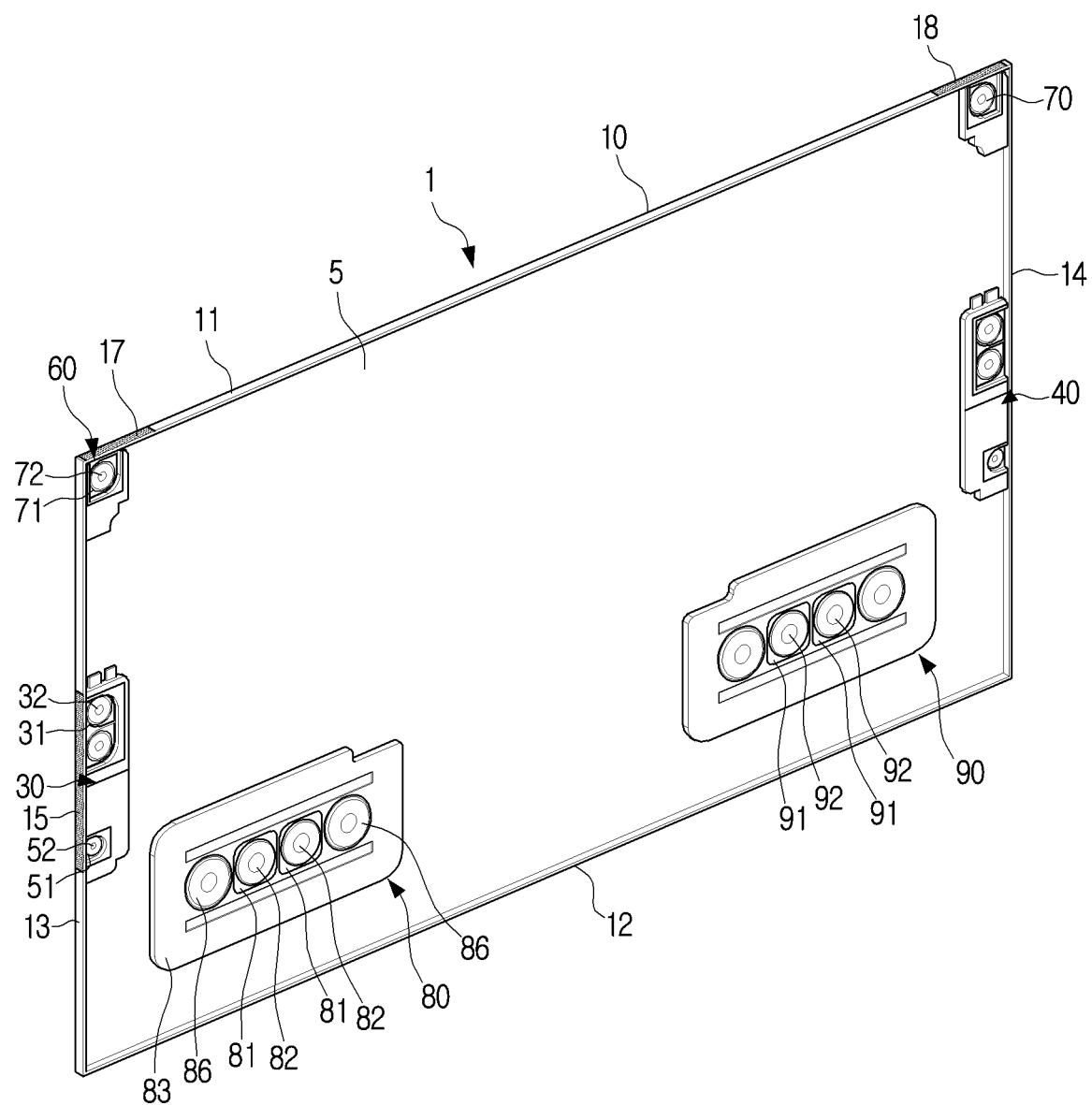
FIG. 4 is a perspective view illustrating a state in which a rear cover is removed from the display apparatus of FIG. 3.

FIG. 3 is a rear perspective view illustrating a display apparatus according to an embodiment of the disclosure, and FIG. 4 is a perspective view illustrating a state in which a rear cover is removed from the display apparatus of FIG. 3.

Referring to FIGS. 3 and 4, a display apparatus 1 according to an embodiment of the disclosure may include a display panel 5, a front cover 10, a rear cover 20, a left speaker 30, and a right speaker 40.

The display panel 5 displays an image and is disposed to be exposed to the front of the display apparatus 1. The display panel 5 may include various types of display panels such as a liquid crystal display panel, an organic light emitting diodes panel, a quantum dot light emitting diodes panel, a micro light emitting diodes (LED) panel, and the like. A conventional display panel may be used as the display panel 5; therefore, a detailed description thereof is omitted.

The front cover 10 may be disposed to support the display panel 5. The front cover 10 may include an opening (not illustrated) through which the front surface of the display panel 5 is exposed.

The front cover 10 may include an upper cover 11 and a lower cover 12 configured to cover upper and lower surfaces of the display panel 5. In addition, the front cover 10 may include a left cover 13 and a right cover 14 configured to cover the left and right surfaces of the display panel 5.

The upper cover 11, the lower cover 12, the left cover 13, and the right cover 14 may be integrally formed with the front cover 10. For example, the upper cover 11, the lower cover 12, the left cover 13, and the right cover 14 may be formed to extend perpendicular to the front cover 10 from the top, bottom, left end, and right end of the front cover 10, respectively. In addition, the upper cover 11 and the lower cover 12 may be integrally formed with the left cover 13 and the right cover 14.

The rear cover 20 is disposed behind the display panel 5 and is formed to cover the rear surface of the display panel 5. The rear cover 20 may be formed to be connected to the upper cover 11, the lower cover 12, the left cover 13, and the right cover 14 disposed on the upper, lower, left and right sides of the display panel 5.

The rear cover 20 may be formed to cover a power board (not illustrated), a control board (not illustrated), the left speaker 30, and the right speaker 40 disposed behind the display panel 5 as shown in FIG. 4.

The power board may be configured to supply power to the display panel 5, the control board, and the left and right speakers 30 and 40. The control board may be configured to control the display panel 5 to output an image and to control the left and right speakers 30 and 40 to output sound.

The left speaker 30 may be disposed adjacent to the left cover 13 between the display panel 5 and the rear cover 20. The right speaker 40 may be disposed adjacent to the right cover 14 between the display panel 5 and the rear cover 20. The left speaker 30 and the right speaker 40 may be arranged to be line-symmetric with respect to the vertical center line of the display panel 5.

The left speaker 30 and the right speaker 40 have the same structure. Therefore, only the left speaker 30 will be described in detail with reference to FIGS. 5 and 6.

Figure 5:
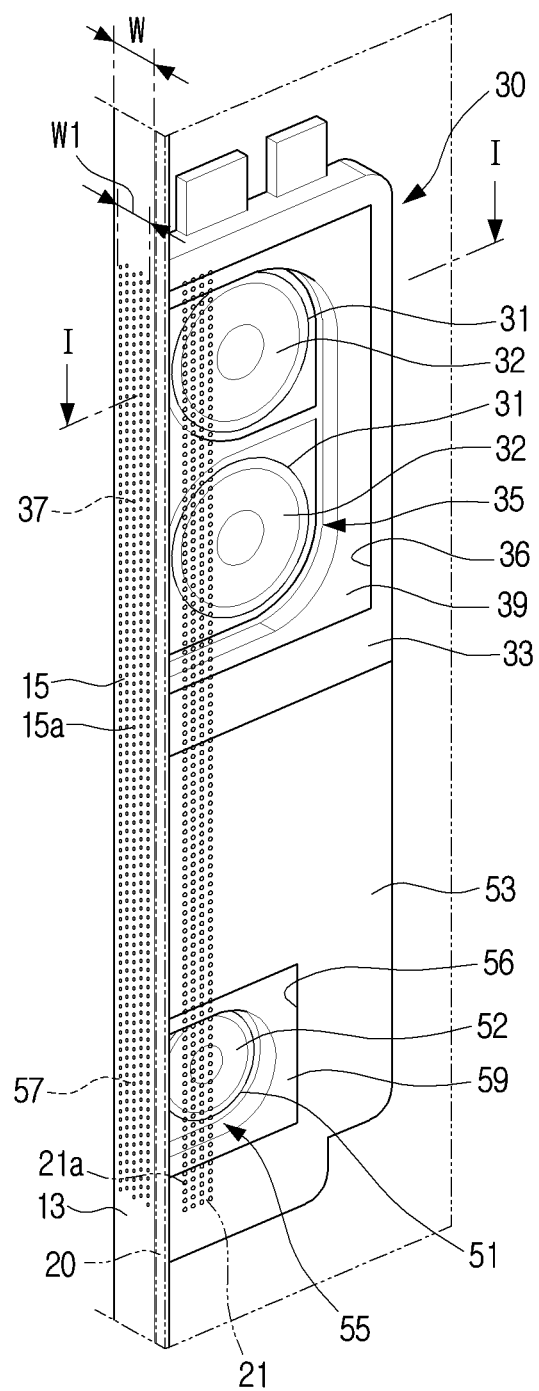
FIG. 5 is a partial perspective view illustrating a left speaker of a display apparatus according to an embodiment of the disclosure.
Figure 6:
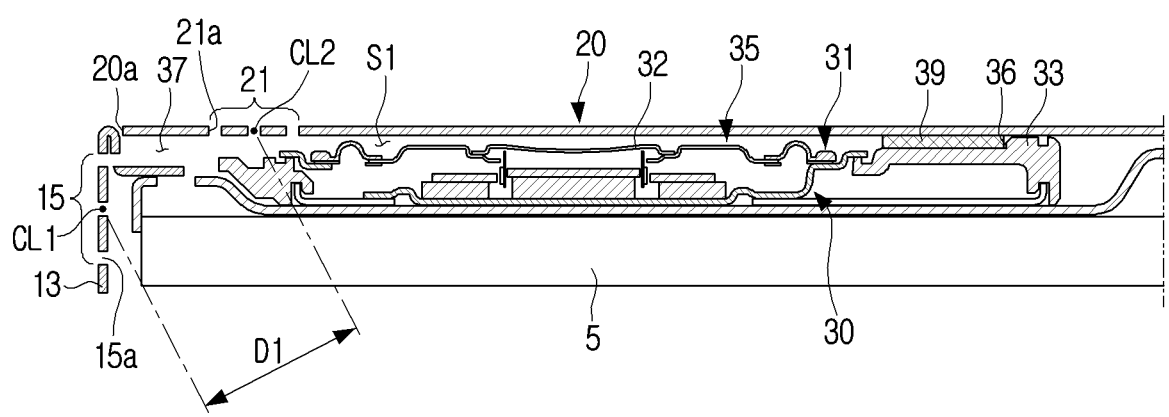
FIG. 6 is a cross-sectional view of the left speaker of FIG. 5 taken along line I-I.

FIG. 5 is a partial perspective view illustrating a left speaker of a display apparatus according to an embodiment of the disclosure. For instance, the left speaker of the display apparatus is the left speaker 30 shown in FIG. 4. FIG. 6 is a cross-sectional view of the left speaker of FIG. 5 taken along line I-I.

Referring to FIGS. 5 and 6, the left speaker 30 may include a speaker driver 31, an enclosure 33, and a waveguide 35.

The speaker driver 31 reproduces sound according to an input signal, and may include a diaphragm 32, a suspension system, and an electric movement system. Two speaker drivers 31 may be arranged side by side in a vertical direction of the display apparatus 1. The two speaker drivers 31, that is, a first speaker driver and a second speaker driver, may be formed in the same structure.

Figure 11:
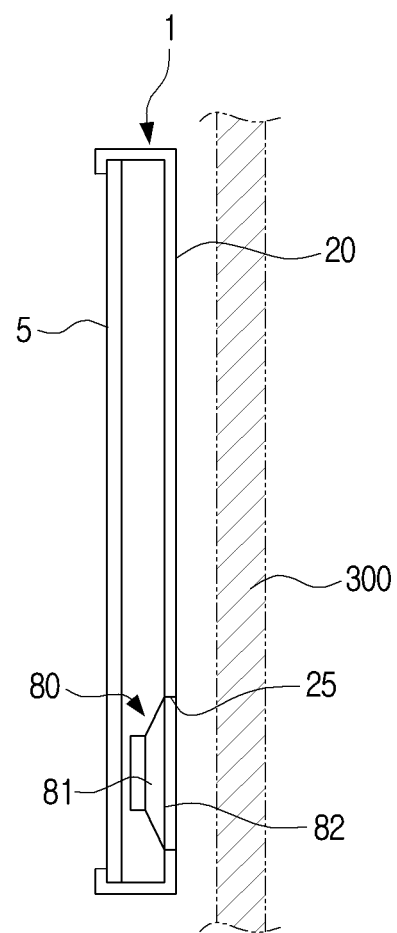
FIG. 11 is a cross-sectional view schematically illustrating a state in which a display apparatus according to an embodiment of the disclosure is disposed in front of a wall.

The left speaker 30 as illustrated in FIG. 5 includes two speaker drivers 31, but the present disclosure is not limited thereto. A left speaker according to an embodiment of the disclosure may include one speaker driver as illustrated in FIG. 11. As another example, although not illustrated, a left speaker may include three or more speaker drivers 31.

The diaphragm 32 of the speaker driver 31 may be disposed to face the rear cover 20 and to be spaced apart from the rear cover 20 by a predetermined distance. Accordingly, a space S1 between the diaphragm 32 of the speaker driver 31 and the rear cover 20 forms a slot. At this time, a portion of the rear cover 20 facing the diaphragm 32 of the speaker driver 31 may function as a reflector that reflects sound generated by the diaphragm 32.

The enclosure 33 may be formed to fix the speaker driver 31 and surround the rear of the speaker driver 31. In addition, the enclosure 33 may be formed to prevent sounds that are in phase opposite to each other, generated in the front and the rear of the diaphragm 32 of the speaker driver 31, from being immediately mixed. In detail, the enclosure 33 may be provided to prevent sound generated in the front of the diaphragm 32 of the speaker driver 31 and sound generated in the rear of the diaphragm 32 from being directly mixed. For example, the enclosure 33 may be configured such that the sound generated in the rear side of the speaker driver 31 is emitted to the outside through appropriate filtering.

The waveguide 35 may be formed as a slot between the diaphragm 32 of the speaker driver 31 and the rear cover 20. In detail, the waveguide 35 may be formed of one surface of the enclosure 33 in which the diaphragm 32 of the speaker driver 31 is disposed, a portion of the rear cover 20 facing the diaphragm 32, and a side wall 36 provided between the one surface of the enclosure 33 and the rear cover 20.

One end of the waveguide 35 may be provided with a sound discharge port 37 through which the sound reproduced by the diaphragm 32 of the speaker driver 31 is discharged. The sound discharge port 37 of the left speaker 30 may be provided to be adjacent to or in contact with the left cover 13. Therefore, the side wall 36 may be disposed to surround the circumference of the diaphragm 32 of the speaker driver 31 excluding the sound discharge port 37. In other words, an opening of the side wall 36 may form the sound discharge port 37.

In this embodiment, the side wall 36 may be formed to block three sides of the diaphragm 32 of the speaker driver 31. Therefore, the sound reproduced by the diaphragm 32 of the speaker driver 31 may be discharged to the outside through the sound discharge port 37, and is not discharged to the inner space between the display panel 5 and the rear cover 20.

The portion of the rear cover 20 facing the diaphragm 32 of the speaker driver 31 may be disposed substantially parallel to one surface of the enclosure 33 in which the diaphragm 32 is disposed, and may reflect the sound reproduced by the diaphragm 32. The portion of the rear cover 20 facing the diaphragm 32 of the speaker driver 31 may be formed in a substantially flat plate shape.

The side wall 36 is disposed around the diaphragm 32 of the speaker driver 31 so that the sound generated by the diaphragm 32 is discharged through the sound discharge port 37. Therefore, the side wall 36 is not disposed in the portion where the sound discharge port 37 is provided. The side wall 36 may be formed to connect the rear cover 20 and the one surface of the enclosure 33 in which the speaker driver 31 is disposed. The side wall 36 may be formed integrally with the enclosure 33.

A sound absorbing member 39 may be disposed on an inner surface of the side wall 36, that is, a surface of the side wall 36 facing the diaphragm 32 of the speaker driver 31.

The sound absorbing member 39 may be formed of a porous material such as a sponge, and the like. The sound absorbing member 39 may be disposed on the entire inner surface of the side wall 36. Alternatively, the sound absorbing member 39 may be disposed only on a portion of the side wall 36 facing the sound discharge port 37.

The left cover 13 may include an opening 15 formed at a portion facing the sound discharge port 37. The opening 15 may be formed in a rectangular shape having a larger area than the sound discharge port 37. In detail, the opening 15 may be formed in a rectangular shape having a long length and a narrow width along the left cover 13.

The width W1 of the opening 15 may be equal to or less than ¼ of the wavelength of the high-frequency limit frequency that the left speaker 30 may reproduce. Alternatively, the opening 15 may be formed to have the width W1 of the opening 15 corresponding to the width W of the left cover 13. Therefore, the sound discharged from the sound discharge port 37 may be emitted to the outside through the opening 15 of the left cover 13.

The opening 15 of the left cover 13 may be formed as a plurality of holes 15a. For example, the opening 15 may be formed by perforating the plurality of holes 15a in the left cover 13. The cross section of each of the plurality of holes 15a may have various shapes such as an elongated hole, a circle, an ellipse, a polygon, and the like.

The rear cover 20 may include a rear opening 21 formed in a portion corresponding to the sound discharge port 37. In addition, the rear opening 21 may be formed to be adjacent to the left cover 13. For example, the rear opening 21 may be formed to be adjacent to the sound discharge port 37 in a portion of the rear cover 20 facing the diaphragm 32 of the speaker driver 31. In addition, the rear opening 21 may be provided in a position not facing the diaphragm 32 of the speaker driver 31. Thus, the sound generated by the diaphragm 32 of the speaker driver 31 may move though the waveguide 35, and then be discharged through the rear opening 21.

The rear opening 21 may be formed in a rectangular shape having a larger area than the sound discharge port 37. In detail, the rear opening 21 may be formed in a rectangular shape having a long length and a narrow width along the left side 20a of the rear cover 20, as illustrated in FIG. 3.

Referring to FIG. 3, the width W2 of the rear opening 21 may be equal to or less than ¼ of the wavelength of the high-frequency limit frequency that the left speaker 30 may reproduce. Therefore, the sound reproduced by the diaphragm 32 of the speaker driver 31 may be emitted to the outside through the rear opening 21 of the rear cover 20.

The rear opening 21 may be formed as a plurality of holes 21a. For example, the rear opening 21 may be formed by perforating the plurality of holes 21a in the rear cover 20. The cross section of each of the plurality of holes 21a may have various shapes such as an elongated hole, a circle, an ellipse, a polygon, and the like.

As illustrated in FIG. 6, in the case of this embodiment, sound reproduced by the speaker driver 31 of the left speaker 30 may be discharged to the outside through the opening 15 formed in the left cover 13 and the rear opening 21 formed in the rear cover 20. At this time, the opening 15 of the left cover 13 and the rear opening 21 of the rear cover 20 may be formed to satisfy a predetermined distance relationship. For example, a distance D1 between a vertical center line CL1 of the opening 15 and a vertical center line CL2 of the rear opening 21 may be set to be equal to or less than ¼ of the wavelength of the high-frequency limit frequency that the left speaker 30 may reproduce.

Referring back to FIGS. 5 and 6, the left speaker 30 may include a third speaker driver 51. The third speaker driver 51 may be disposed to be spaced by a predetermined distance downward from the first and second speaker drivers 31 described above in the vertical direction of the display apparatus 1. In other words, the third speaker driver 51 may be disposed at a predetermined distance from the first and second speaker drivers 31 along the left side 20a of the rear cover 20.

When the left speaker 30 includes the third speaker driver 51, the first and second speaker drivers 31 and the enclosure 33 form a mid-range speaker, and the third speaker driver 51 forms a tweeter.

A sub-enclosure 53 may be formed to surround the third speaker driver 51. The sub-enclosure 53 may be formed integrally with the enclosure 33 of the first and second speaker drivers 31. The inner space of the sub-enclosure 53 may be formed to communicate with the inner space of the enclosure 33. As another example, the inner space of the sub-enclosure 53 may be formed so as not to communicate with the inner space of the enclosure 33.

A sub-waveguide 55 may be formed as a slot between the diaphragm 52 of the third speaker driver 51 and the rear cover 20. In detail, the sub-waveguide 55 may be formed of one surface of the sub-enclosure 53 in which the diaphragm 52 of the third speaker driver 51 is disposed, a portion of the rear cover 20 facing the diaphragm 52 of the third speaker driver 51, and a sub-side wall 56 disposed between the one surface of the sub-enclosure 53 and the rear cover 20.

One end of the sub-waveguide 55 may be provided with a sub-sound discharge port 57 through which sound reproduced by the diaphragm 52 of the third speaker driver 51 may be discharged. The sub-sound discharge port 57 of the left speaker 30 may be provided to be adjacent to or in contact with the left cover 13. Therefore, the sub-side wall 56 may be disposed to surround the circumference of the diaphragm 52 of the third speaker driver 51 excluding the sub-sound discharge port 57. In other words, an opening of the sub-side wall 56 may form the sub-sound discharge port 57.

In this embodiment, the sub-side wall 56 may be formed to block three sides of the diaphragm 52 of the third speaker driver 51. Further, the sub-waveguide 55 may be disposed to be spaced apart from the waveguide 35 by a predetermined distance, and may be isolated by the sub-side wall 56 and the side wall 36 of the mid-range speaker.

Therefore, the sound reproduced by the diaphragm 52 of the third speaker driver 51 may be discharged to the outside through the sub-sound discharge port 57, and is not discharged to the inner space between the display panel 5 and the rear cover 20.

The portion of the rear cover 20 facing the diaphragm 52 of the third speaker driver 51 may be disposed substantially parallel to one surface of the sub-enclosure 53 in which the diaphragm 52 is disposed, and may reflect the sound reproduced by the diaphragm 52 of the third speaker driver 51. The portion of the rear cover 20 facing the diaphragm 52 of the third speaker driver 51 may be formed in a substantially flat plate shape.

The sub-side wall 56 is disposed around the diaphragm 52 of the third speaker driver 51 so that the sound generated by the diaphragm 52 is discharged through the sub-sound discharge port 57. Therefore, the sub-side wall 56 is not disposed in the portion where the sub-sound discharge port 57 is provided. The sub-side wall 56 may be formed to connect the rear cover 20 and the one surface of the sub-enclosure 53 in which the third speaker driver 51 is disposed. The sub-side wall 56 may be formed integrally with the sub-enclosure 53.

A sound absorbing member 59 may be disposed on an inner surface of the sub-side wall 56, that is, a surface of the sub-side wall 56 facing the diaphragm 52 of the third speaker driver 51. The sound absorbing member 59 may be formed of a porous material such as a sponge, and the like. The sound absorbing member 59 may be disposed on the entire inner surface of the sub-side wall 56. Alternatively, the sound absorbing member 59 may be disposed only on a portion of the sub-side wall 56 facing the sub-sound discharge port 57.

The right speaker 40 may be disposed on the rear side of the display panel 5 at a position farthest horizontally from the left speaker 30 described above.

The right speaker 40 shown in FIG. 4 has the same structure as the left speaker 30 described above; therefore, a detailed description thereof is omitted. However, there is a difference in that a sound discharge port of the right speaker 40 is provided to be adjacent to or in contact with the right cover 14. In addition, there is a difference in that sound reproduced by the right speaker 40 is emitted to the outside through a rear opening 22 provided in the right portion of the rear cover 20.

Referring back to FIGS. 3 and 4, the display apparatus 1 according to an embodiment of the disclosure may include an upper left speaker 60 and an upper right speaker 70.

The upper left speaker 60 may be disposed at the upper left corner of the rear side of the display panel 5, and the upper right speaker 70 may be disposed at the upper right corner of the rear side of the display panel 5. In other words, the upper left speaker 60 and the upper right speaker 70 may be disposed at positions as far apart as possible in the horizontal direction from each other.

The upper left speaker 60 and the upper right speaker 70 may be formed in the same structure. Therefore, for convenience of explanation, only the upper left speaker 60 will be described in detail with reference to FIGS. 7 and 8.

Figure 7:
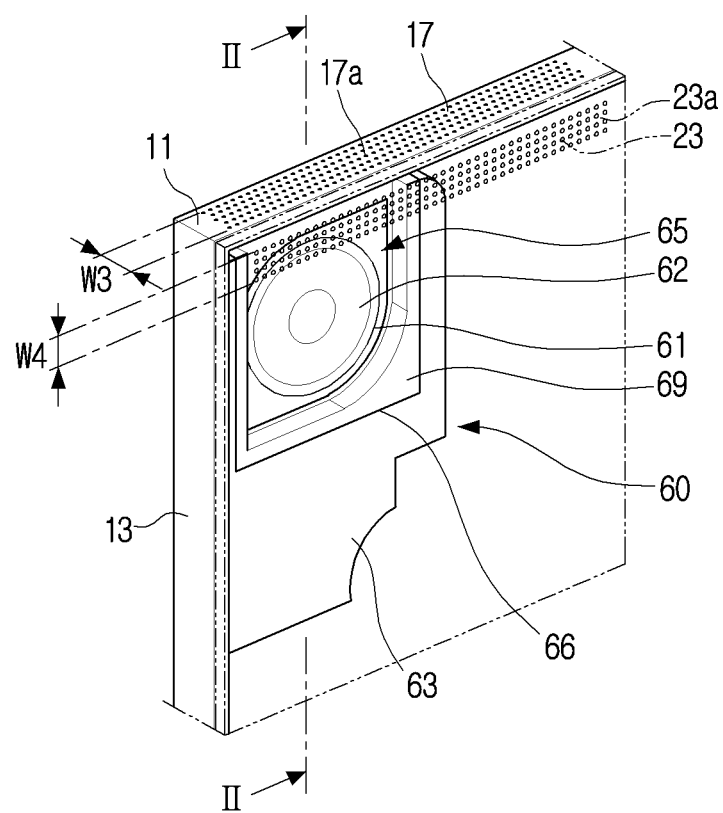
FIG. 7 is a partial perspective view illustrating an upper left speaker of a display apparatus according to an embodiment of the disclosure.
Figure 8:
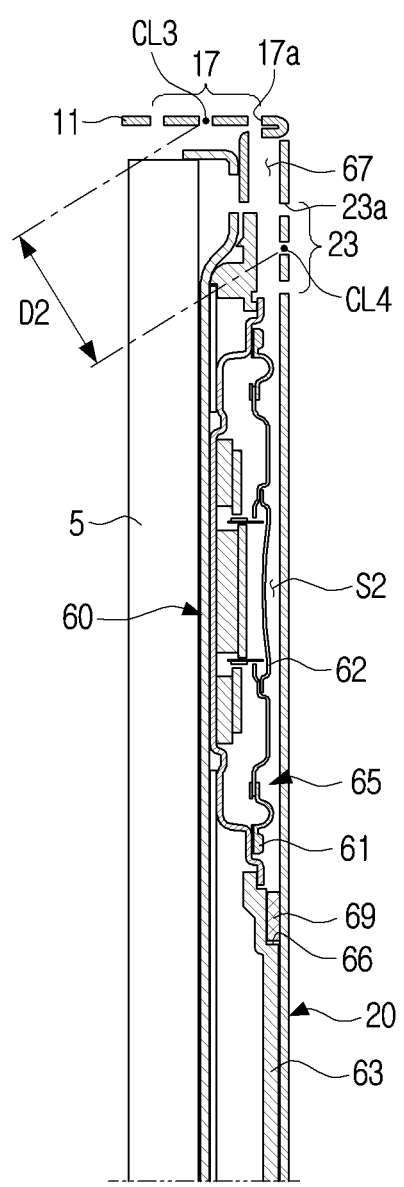
FIG. 8 is a cross-sectional view of the upper left speaker of FIG. 7 taken along line II-II.

FIG. 7 is a partial perspective view illustrating an upper left speaker of a display apparatus according to an embodiment of the disclosure, and FIG. 8 is a cross-sectional view of the upper left speaker of FIG. 7 taken along line II-II.

Referring to FIGS. 7 and 8, the upper left speaker 60 may include an upper speaker driver 61, an upper enclosure 63, and an upper waveguide 65.

The upper speaker driver 61 reproduces sound according to an input signal, and may include a diaphragm 62, a suspension system, and an electric movement system.

The diaphragm 62 of the upper speaker driver 61 may be disposed to face the rear cover 20 and to be spaced apart from the rear cover 20 by a predetermined distance. Accordingly, a space S2 between the diaphragm 62 of the upper speaker driver 61 and the rear cover 20 forms a slot. At this time, a portion of the rear cover 20 facing the diaphragm 62 of the upper speaker driver 61 may function as a reflector that reflects sound reproduced by the diaphragm 62.

The upper enclosure 63 may be formed to fix the upper speaker driver 61 and surround the rear of the upper speaker driver 61. In addition, the upper enclosure 63 may be formed to prevent sounds that are in phase opposite to each other, generated in the front and the rear of the diaphragm 62 of the upper speaker driver 61, from being immediately mixed. In detail, the upper enclosure 63 may be provided to prevent sound generated in the front of the diaphragm 62 of the upper speaker driver 61 and sound generated in the rear of the diaphragm 62 from being directly mixed.

The upper waveguide 65 may be formed as a slot between the diaphragm 62 of the upper speaker driver 61 and the rear cover 20. In detail, the upper waveguide 65 may be formed of one surface of the upper enclosure 63 in which the diaphragm 62 of the upper speaker driver 61 is disposed, a portion of the rear cover 20 facing the diaphragm 62 of the upper speaker driver 61, and an upper side wall 66 provided between the one surface of the upper enclosure 63 and the rear cover 20.

One end of the upper waveguide 65 may be provided with an upper sound discharge port 67 through which the sound reproduced by the diaphragm 62 of the upper speaker driver 61 is discharged. The upper sound discharge port 67 of the upper left speaker 60 may be provided to be adjacent to or in contact with the upper cover 11.

The upper side wall 66 may be disposed to surround the circumference of the diaphragm 62 of the upper speaker driver 61 except for the upper sound discharge port 67. In other words, an opening of the upper side wall 66 may form the upper sound discharge port 67.

In this embodiment, the upper side wall 66 may be formed to block three sides of the diaphragm 62 of the upper speaker driver 61. Therefore, the sound reproduced by the diaphragm 62 of the upper speaker driver 61 may be discharged to the outside through the upper sound discharge port 67, and is not discharged to the inner space between the display panel 5 and the rear cover 20.

The portion of the rear cover 20 facing the diaphragm 62 of the upper speaker driver 61 may be disposed substantially parallel to one surface of the upper enclosure 63 in which the diaphragm 62 is disposed, and may reflect the sound reproduced by the diaphragm 62. The portion of the rear cover 20 facing the diaphragm 62 of the upper speaker driver 61 may be formed in a substantially flat plate shape.

The upper side wall 66 is disposed around the diaphragm 62 of the upper speaker driver 61 so that the sound generated by the diaphragm 62 is discharged through the upper sound discharge port 67. Therefore, the upper side wall 66 is not disposed in the portion of the rear cover 20 where the upper sound discharge port 67 is provided.

The upper side wall 66 may be formed to connect the rear cover 20 and the one surface of the upper enclosure 63 in which the upper speaker driver 61 is disposed. In detail, the upper side wall 66 may be formed to seal the space between the rear cover 20 and the upper enclosure 63. The upper side wall 66 may be formed integrally with the upper enclosure 63. As another example, the upper side wall 66 may be formed separately from the upper enclosure 63.

The upper side wall 66 may be formed of a material that reflects sound. In this case, a sound absorbing member 69 may be disposed on an inner surface of the upper side wall 66, that is, a surface of the upper side wall 66 facing the diaphragm 62 of the upper speaker driver 61. The sound absorbing member 69 may be formed of a porous material, such as a sponge and the like, so as to absorb some of the sound reproduced by the upper speaker driver 61.

The sound absorbing member 69 may be disposed on the entire inner surface of the upper side wall 66. Alternatively, the sound absorbing member 69 may be disposed only on a portion of the upper side wall 66 facing the upper sound discharge port 67. As another example, the upper side wall 66 may be formed of the sound absorbing member 69.

The upper cover 11 may include an upper opening 17 formed at a portion facing the upper sound discharge port 67. The upper opening 17 may be formed in a rectangular shape having a larger area than the upper sound discharge port 67. In detail, the upper opening 17 may be formed in a rectangular shape having a long length and a narrow width along the upper cover 11.

The width W3 of the upper opening 17 may be equal to or less than ¼ of the wavelength of the high-frequency limit frequency that the upper left speaker 60 may reproduce. Alternatively, the upper opening 17 may be formed to have the width W3 corresponding to the width W of the upper cover 11. Therefore, the sound discharged from the upper sound discharge port 67 may be discharged to the outside through the upper opening 17 of the upper cover 11, that is, toward the upper side of the display apparatus 1.

The upper opening 17 of the upper cover 11 may be formed as a plurality of holes 17a. For example, the upper opening 17 may be formed by perforating the plurality of holes 17a in the upper cover 11. The cross section of each of the plurality of holes 17a may have various shapes such as an elongated hole, a circle, an ellipse, a polygon, or the like.

The rear cover 20 may include an upper rear opening 23 formed in a portion corresponding to the upper sound discharge port 67. In addition, the upper rear opening 23 may be formed to be adjacent to or in contact with the upper cover 11. For example, the upper rear opening 23 may be formed adjacent to the upper sound discharge port 67 in the portion of the rear cover 20 facing the diaphragm 62 of the upper speaker driver 61. In addition, the upper rear opening 23 may be formed not to face the diaphragm 62 of the upper speaker driver 61. Then, the sound generated by the diaphragm 62 of the upper speaker driver 61 may move though the upper waveguide 65 and be discharged through the upper rear opening 23.

The upper rear opening 23 may be formed in a rectangular shape having a larger area than the upper sound discharge port 67. In detail, the upper rear opening 23 may be formed in a rectangular shape having a long length and a narrow width along the upper side 20b of the rear cover 20.

The width W4 of the upper rear opening 23 may be equal to or less than ¼ of the wavelength of the high-frequency limit frequency that the upper left speaker 60 may reproduce. Therefore, the sound generated by the diaphragm 62 of the upper speaker driver 61 may be emitted to the outside through the upper rear opening 23 of the rear cover 20.

The upper rear opening 23 may be formed as a plurality of holes 23a. For example, the upper rear opening 23 may be formed by perforating the plurality of holes 23a in the rear cover 20. The cross section of each of the plurality of holes 23a may have various shapes such as an elongated hole, a circle, an ellipse, a polygon, and the like.

As illustrated in FIG. 7, in the case of this embodiment, sound reproduced by the upper speaker driver 61 of the upper left speaker 60 may be discharged to the outside through the upper opening 17 formed in the upper cover 11 and the upper rear opening 23 formed in the rear cover 20.

At this time, the upper opening 17 of the upper cover 11 and the upper rear opening 23 of the rear cover 20 may be disposed adjacent to each other, and may be formed to satisfy a predetermined distance relationship. For example, referring to FIG. 8, a distance D2 between a vertical center line CL3 of the upper opening 17 and a vertical center line CL4 of the upper rear opening 23 may be set to be equal to or less than ¼ of the wavelength of the high-frequency limit frequency that the upper left speaker 60 may reproduce.

The upper right speaker 70 may be disposed on the rear side of the display panel 5 at a position as far away as possible in a horizontal direction from the above-described upper left speaker 60.

The upper right speaker 70 shown in FIG. 4 is formed in the same structure as the upper left speaker 60 described above; therefore, a detailed description thereof is omitted. However, there is a difference in that a sound discharge port of the upper right speaker 70 is provided to be adjacent to or in contact with an upper opening 18 formed in the right portion of the upper cover 11. In addition, there is a difference in that sound reproduced by the upper right speaker 70 is emitted to the outside through an upper rear opening 24 provided in the upper right portion of the rear cover 20.

Referring back to FIGS. 3 and 4, the display apparatus 1 according to an embodiment of the disclosure may include a left woofer speaker 80 and a right woofer speaker 90.

As illustrated in FIG. 4, the left woofer speaker 80 may be disposed at the lower left portion of the rear side of the display panel 5, and the right woofer speaker 90 may be disposed at the lower right portion of the rear side of the display panel 5. In other words, the left woofer speaker 80 and the right woofer speaker 90 may be disposed to be spaced apart from each other by a predetermined distance in the horizontal direction. The left woofer speaker 80 and the right woofer speaker 90 may be formed in the same structure. Therefore, hereinafter, for convenience of description, only the left woofer speaker 80 will be described in detail with reference to FIGS. 9 and 10.

Figure 9:
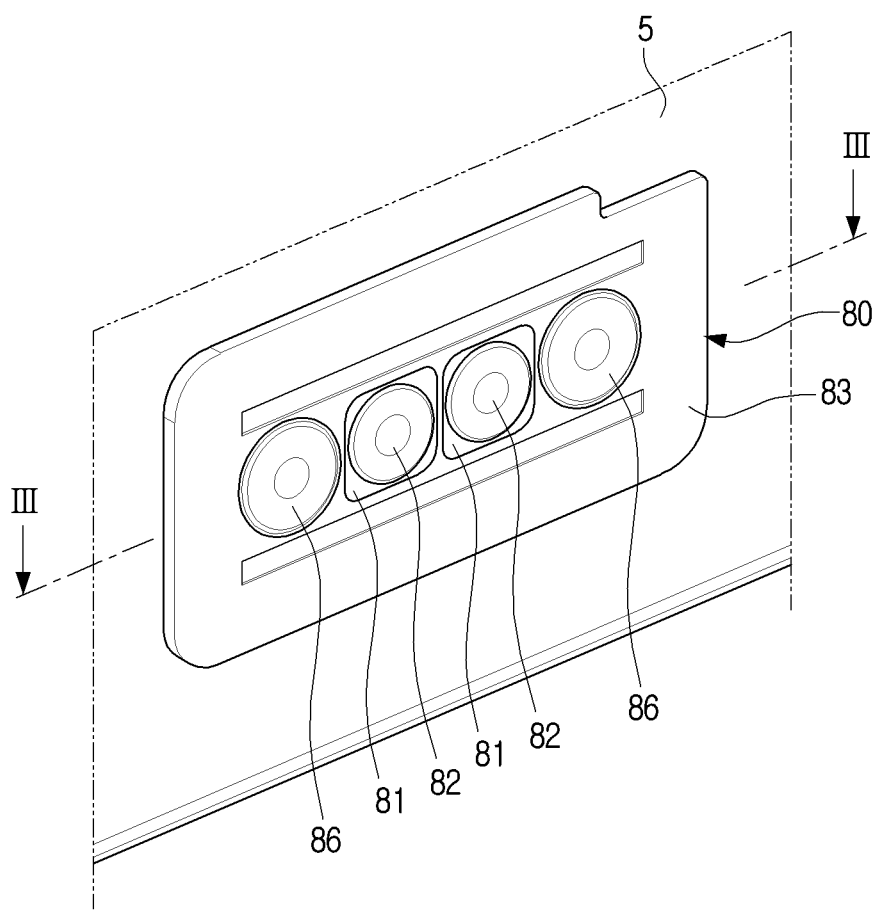
FIG. 9 is a partial perspective view illustrating a left woofer speaker of a display apparatus according to an embodiment of the disclosure.
Figure 10:
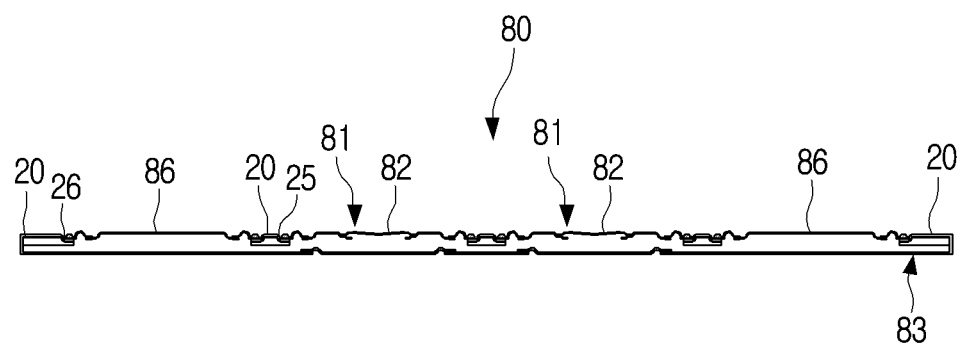
FIG. 10 is a cross-sectional view of the left woofer speaker of FIG. 9 taken along line III-III.

FIG. 9 is a partial perspective view illustrating a left woofer speaker of a display apparatus according to an embodiment of the disclosure, and FIG. 10 is a cross-sectional view of the left woofer speaker of FIG. 9 taken along line III-III.

Referring to FIGS. 9 and 10, the left woofer speaker 80 according to an embodiment of the disclosure may include two speaker drivers 81, an enclosure 83, and two passive radiators 86. Referring to FIG. 4, the right woofer speaker 90 may include two speaker drivers 91 each of which includes a diaphragm 92.

The two speaker drivers 81 reproduce sound according to an input signal, and may include a diaphragm 82, a suspension system, and an electric movement system, respectively. The left woofer speaker 80 as illustrated in FIGS. 9 and 10 includes two speaker drivers 81, but this disclosure is not limited thereto. As another example, the left woofer speaker 80 may include one or three or more speaker drivers, one or three or more passive radiators or ducts.

The enclosure 83 may be formed to fix the two speaker drivers 81 and surround the rear of the speaker drivers 81. In addition, the enclosure 83 may be formed to prevent sounds that are in phase opposite to each other, generated in the front and the rear of the speaker drivers 81, from being immediately mixed. In detail, the enclosure 83 may be provided to prevent sound generated in the front of the diaphragms 82 of the speaker drivers 81 and sound generated in the rear of the diaphragms 82 from being immediately mixed.

For example, the enclosure 83 may be configured such that sound generated in the rear side of the speaker drivers 81 is emitted to the outside through appropriate filtering. As an acoustic filtering method, various methods such as a closed low sound reflection type (Vented type), a passive radiator type, a Vario Vent type that is an open type equipped with a resistor, and the like may be applied.

The two speaker drivers 81, that is, a first speaker driver and a second speaker driver, may be arranged side by side in the horizontal direction of the display apparatus 1. The first speaker driver and the second speaker driver may be formed in the same structure.

The passive radiators 86 may be provided on one surface of the enclosure 83 at one side of the speaker driver 81. In detail, the passive radiator 86 may be disposed at one side of each of the speaker drivers 81 between the display panel 5 and the rear cover 20.

In the case of this embodiment, two passive radiators 86, that is, a first passive radiator and a second passive radiator, are disposed in the enclosure 83 on both sides of the two speaker drivers 81. In other words, the first passive radiator 86 is disposed on the left side of the first speaker driver 81, and the second passive radiator 86 is disposed on the right side of the second speaker driver 81. The two passive radiators 86 may be formed to have a larger diameter than the diaphragms 82 of the speaker drivers 81.

Referring to FIG. 10, the rear cover 20 may include a woofer opening 25 through which the diaphragm 82 of the speaker driver 81 is exposed. In detail, two woofer openings 25 through which the diaphragms 82 of the two speaker drivers 81 are exposed may be formed in a portion of the rear cover 20 facing the left woofer speaker 80.

The woofer openings 25 are formed in a shape and size corresponding to the diaphragm 82 of the speaker driver 81. Therefore, when the diaphragms 82 of the speaker drivers 81 vibrate, the diaphragms 82 do not interfere with the rear cover 20.

In addition, when the passive radiator 86 is disposed on one side of the speaker driver 81, the rear cover 20 includes a radiator opening 26 corresponding to the passive radiator 86. In detail, the radiator opening 26 through which the passive radiator 86 is exposed is formed in a portion of the rear cover 20 facing the passive radiator 86.

The radiator opening 26 may be formed in a shape and size corresponding to the passive radiator 86. Thus, when the passive radiator 86 vibrates, the rear cover 20 does not interfere with the passive radiator 86.

In the case of this embodiment as illustrated in FIGS. 9 and 10, the left woofer speaker 80 includes two passive radiators 86. Therefore, the rear cover 20 includes two radiator openings 26 as illustrated in FIG. 3.

As described above, when the woofer openings 25 corresponding to the diaphragms 82 of the speaker drivers 81 and the radiator openings 26 corresponding to the passive radiators 86 are formed in the rear cover 20, the diaphragms 82 and the passive radiators 86 of the woofer speaker 80 do not interfere with the rear cover 20, so that the thickness of the display apparatus 1 may be made thinner.

On the other hand, the display apparatus 1 according to an embodiment of the disclosure may be generally disposed in front of a wall 300 as illustrated in FIG. 11. Accordingly, when the woofer openings 25 and the radiator openings 26 are formed in the rear cover 20 like the display apparatus 1 according to an embodiment of the disclosure, a gap between the display apparatus 1 and the wall 300 may be used as a space in which the diaphragms 82 and the passive radiators 86 of the woofer speaker 80 vibrate. For reference, FIG. 11 is a cross-sectional view schematically illustrating a state in which a display apparatus according to an embodiment of the disclosure is disposed in front of a wall.

The display apparatus 1 according to an embodiment of the disclosure as illustrated in FIGS. 3 and 4 includes the left woofer speaker 80 and the right woofer speaker 90. However, the display apparatus 1 according to the disclosure is not limited thereto.

Although not illustrated, a display apparatus according to another embodiment of the disclosure may include one woofer speaker. When the display apparatus includes one woofer speaker, the woofer speaker may be disposed in the center of the rear surface of the display apparatus 1. In other words, the display apparatus according to an embodiment of the disclosure may include one or more woofer speakers to increase the volume of a low frequency range.

On the other hand, in the above description, the left and right speakers 30 and 40 of the display apparatus 1 according to an embodiment of the disclosure include a mid-range speaker and a tweeter. However, the left and right speakers used in the display apparatus of the disclosure are not limited thereto.

A display apparatus 1' according to another embodiment of the disclosure may include a left speaker and a right speaker formed as a full-range speaker. Hereinafter, the display apparatus 1' including the left speaker and the right speaker configured as a full-range speaker will be described with reference to FIG. 12.

Figure 12:
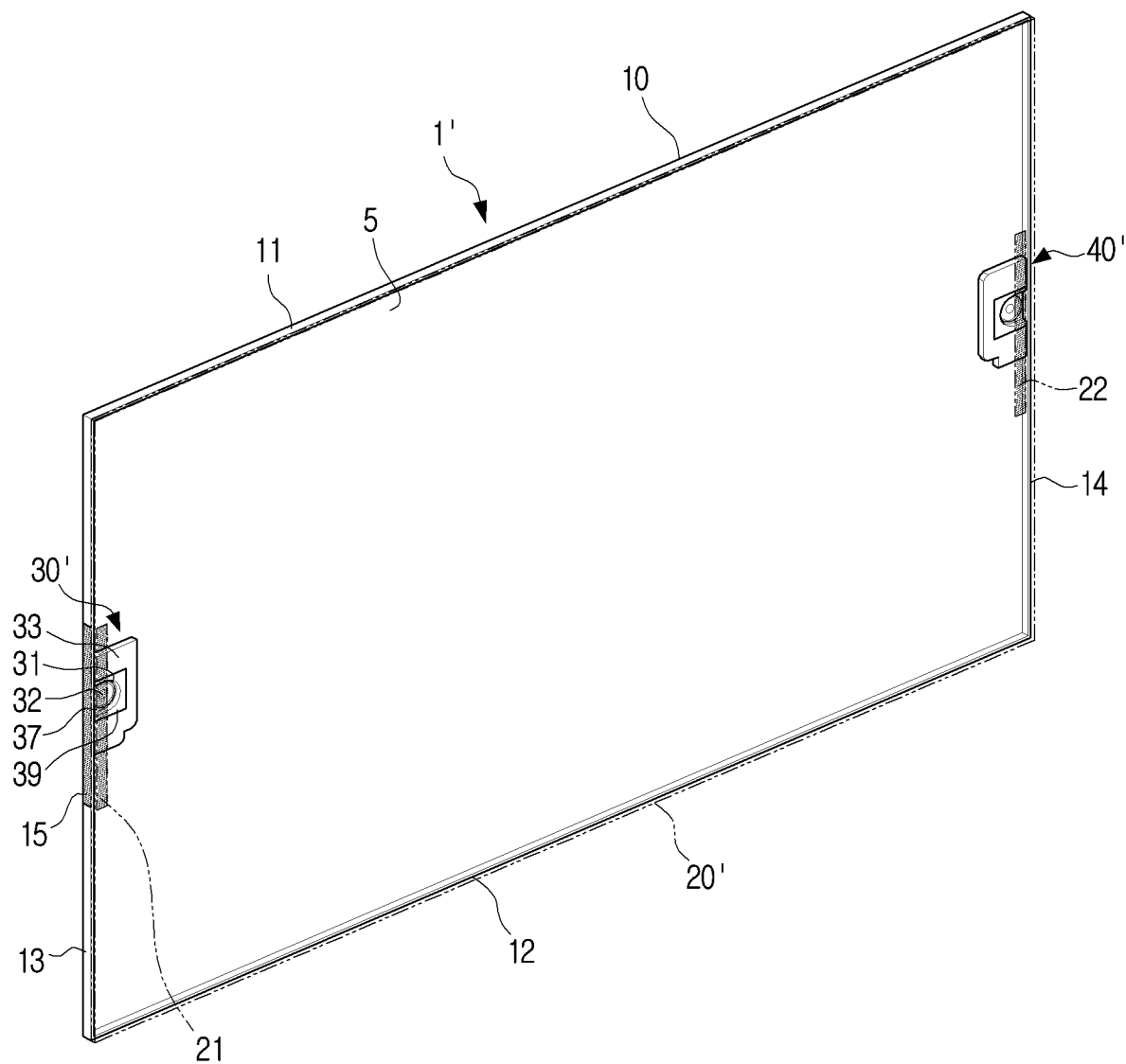
FIG. 12 is a rear perspective view illustrating a display apparatus according to another embodiment of the disclosure.

FIG. 12 is a rear perspective view illustrating a display apparatus according to another embodiment of the disclosure. For reference, in FIG. 12, a rear cover 20' is indicated by a virtual line for convenience of illustration.

Referring to FIG. 12, a display apparatus 1' according to an embodiment of the disclosure may include a display panel 5, a front cover 10, a rear cover 20', a left speaker 30', and a right speaker 40'.

The display panel 5 displays an image and is disposed to be exposed to the front of the display apparatus 1'. The display panel 5 may include various types of display panels such as a liquid crystal display panel, an organic light emitting diodes panel, a quantum dot light emitting diodes panel, a micro light emitting diode (LED) panel, and the like. A conventional display panel may be used as the display panel 5, so a detailed description thereof is omitted.

The front cover 10 may be disposed to support the display panel 5. The front cover 10 may include an opening through which the front surface of the display panel 5 is exposed.

The front cover 10 may include an upper cover 11 and a lower cover 12 configured to cover an upper surface and a lower surface of the display panel 5. In addition, the front cover 10 may include a left cover 13 and a right cover 14 configured to cover a left surface and a right surface of the display panel 5.

The upper cover 11, the lower cover 12, the left cover 13, and the right cover 14 may be integrally formed with the front cover 10. For example, the upper cover 11, the lower cover 12, the left cover 13, and the right cover 14 may be formed to extend perpendicular to the front cover 10 from the top, bottom, left end, and right end of the front cover 10, respectively. In addition, the upper cover 11 and the lower cover 12 may be integrally formed with the left cover 13 and the right cover 14.

The rear cover 20' is disposed behind the display panel 5 and is formed to cover the rear surface of the display panel 5. The rear cover 20' may be formed to be connected to the upper cover 11, the lower cover 12, the left cover 13, and the right cover 14 disposed on the upper, lower, left and right sides of the display panel 5.

The rear cover 20' may be formed to cover a power board, a control board, the left speaker 30', and the right speaker 40' disposed behind the display panel 5.

The power board may be configured to supply power to the display panel 5, the control board, and the left and right speakers 30' and 40'. The control board may be configured to control the display panel 5 to output an image and to control the left and right speakers 30' and 40' to reproduce sound.

The left speaker 30' may be disposed adjacent to the left cover 13 between the display panel 5 and the rear cover 20'. The right speaker 40' may be disposed adjacent to the right cover 14 between the display panel 5 and the rear cover 20'. The left speaker 30' and the right speaker 40' may be arranged to be line-symmetric with respect to the vertical center line of the display panel 5.

The left speaker 30' and the right speaker 40' have the same structure. Therefore, only the left speaker 30' will be described in detail.

The left speaker 30' may include a speaker driver 31, an enclosure 33, and a waveguide 35.

The speaker driver 31 reproduces sound according to an input signal, and may include a diaphragm 32, a suspension system, and an electric movement system.

The left speaker 30' as illustrated in FIG. 12 includes one speaker driver 31, but the present disclosure is not limited thereto. The left speaker 30' according to an embodiment of the disclosure may include two or more speaker driver 31.

The diaphragm 32 of the speaker driver 31 is disposed to face the rear cover 20' and to be spaced apart from the rear cover 20' by a predetermined distance. Accordingly, the space between the diaphragm 32 of the speaker driver 31 and the rear cover 20' forms a slot. At this time, a portion of the rear cover 20' facing the diaphragm 32 of the speaker driver 31 may function as a reflector that reflects the sound generated by the diaphragm 32.

The enclosure 33 may be formed to fix the speaker driver 31 and surround the rear of the speaker driver 31. In addition, the enclosure 33 may be formed to prevent sounds that are in phase opposite to each other, generated in the front and the rear of the speaker driver 31, from being immediately mixed. In detail, the enclosure 33 may be provided to prevent sound generated in the front of the diaphragm 32 of the speaker driver 31 and sound generated in the rear of the diaphragm 32 from being directly mixed. For example, the enclosure 33 may be configured such that the sound generated from the rear side of the speaker driver 31 is emitted to the outside through appropriate filtering.

The waveguide 35 may be formed as a slot between the diaphragm 32 of the speaker driver 31 and the rear cover 20'. In detail, the waveguide 35 may be formed of one surface of the enclosure 33 in which the diaphragm 32 of the speaker driver 31 is disposed, a portion of the rear cover 20' facing the diaphragm 32, and a side wall 36 provided between the one surface of the enclosure 33 and the rear cover 20'.

One end of the waveguide 35 may be provided with a sound discharge port 37 through which the sound reproduced by the diaphragm 32 of the speaker driver 31 is discharged. The sound discharge port 37 of the left speaker 30' may be provided to be adjacent to or in contact with the left cover 13. Therefore, the side wall 36 may be disposed to surround the circumference of the diaphragm 32 of the speaker driver 31 excluding the sound discharge port 37. In other words, an opening of the side wall 36 may form the sound discharge port 37.

In this embodiment, the side wall 36 may be formed to block three sides of the diaphragm 32 of the speaker driver 31. Therefore, the sound reproduced by the diaphragm 32 of the speaker driver 31 may be discharged to the outside through the sound discharge port 37, and is not discharged to the inner space between the display panel 5 and the rear cover 20'.

The portion of the rear cover 20' facing the diaphragm 32 of the speaker driver 31 may be disposed substantially parallel to one surface of the enclosure 33 in which the diaphragm 32 is disposed, and may reflect the sound generated by the diaphragm 32. The portion of the rear cover 20' facing the diaphragm 32 of the speaker driver 31 may be formed in a substantially flat plate shape.

The side wall 36 may be disposed around the diaphragm 32 of the speaker driver 31 so that the sound generated by the diaphragm 32 is discharged through the sound discharge port 37. Therefore, the side wall 36 is not disposed in the portion where the sound discharge port 37 is provided. The side wall 36 may be formed to connect the rear cover 20' and the one surface of the enclosure 33 in which the speaker driver 31 is disposed. The side wall 36 may be formed integrally with the enclosure 33.

A sound absorbing member 39 may be disposed on an inner surface of the side wall 36, that is, a surface of the side wall 36 facing the diaphragm 32 of the speaker driver 31. The sound absorbing member 39 may be formed of a porous material such as a sponge, and the like. The sound absorbing member 39 may be disposed on the entire inner surface of the side wall 36. Alternatively, the sound absorbing member 39 may be disposed only on a portion of the side wall 36 facing the sound discharge port 37.

The left cover 13 may include an opening 15 formed at a portion facing the sound discharge port 37. The opening 15 may be formed in a rectangular shape having a larger area than the sound discharge port 37. In detail, the opening 15 may be formed in a rectangular shape having a long length and a narrow width along the left cover 13.

The width of the opening 15 may be equal to or less than ¼ of the wavelength of the high-frequency limit frequency that the left speaker 30' may reproduce. Alternatively, the opening 15 may be formed to have a width corresponding to the width of the left cover 13. Therefore, the sound discharged from the sound discharge port 37 may be emitted to the outside through the opening 15 of the left cover 13.

The opening 15 may be formed as a plurality of holes 15a. For example, the opening 15 may be formed by perforating a plurality of holes 15a in the left cover 13. The cross section of each of the plurality of holes 15a may have various shapes such as an elongated hole, a circle, an ellipse, a polygon, and the like.

The rear cover 20' may include a rear opening 21 formed in a portion corresponding to the sound discharge port 37. In addition, the rear opening 21 may be formed to be adjacent to the left cover 13. For example, the rear opening 21 may be formed adjacent to the sound discharge port 37 in a portion of the rear cover 20' facing the diaphragm 32 of the speaker driver 31. Then, the sound generated by the diaphragm 32 of the speaker driver 31 may move though the waveguide 35 and be discharged through the rear opening 21.

The rear opening 21 may be formed in a rectangular shape having a larger area than the sound discharge port 37. In detail, the rear opening 21 may be formed in a rectangular shape having a long length and a narrow width along the left side of the rear cover 20'. The width of the rear opening 21 may be equal to or less than ¼ of the wavelength of the high-frequency limit frequency that the left speaker 30' may reproduce. Therefore, the sound reproduced by the diaphragm 32 of the speaker driver 31 may be emitted to the outside through the rear opening 21 of the rear cover 20'.

The rear opening 21 may be formed as a plurality of holes 21a. For example, the rear opening 21 may be formed by perforating a plurality of holes 21a in the rear cover 20'. The cross section of each of the plurality of holes 21a may have various shapes such as an elongated hole, a circle, an ellipse, a polygon, and the like.

In the case of this embodiment, sound reproduced by the speaker driver 31 of the left speaker 30' may be discharged to the outside through the opening 15 formed in the left cover 13 and the rear opening 21 formed in the rear cover 20'.

At this time, the opening 15 of the left cover 13 and the rear opening 21 of the rear cover 20' may be formed to satisfy a predetermined distance relationship. For example, as in the embodiment shown in FIG. 5, the distance between a vertical center line of the opening 15 and a vertical center line of the rear opening 21 may be set to be equal to or less than ¼ of the wavelength of the high-frequency limit frequency that the left speaker 30' may reproduce.

In the display apparatuses 1 and 1' according to an embodiment of the disclosure, a sound radiation direction and a sound beam width of sound reproduced by each of the left speakers 30 and 30' and the right speakers 40 and 40' may be controlled by the opening 15 formed in the left cover 13 and the right cover 14 and the rear openings 21 and 22 formed in the rear covers 20 and 20'.

Hereinafter, a manner in which the sound radiation direction and the sound beam width of sound reproduced by the left speaker 30 are adjusted by the opening 15 of the left cover 13 and the rear opening 21 of the rear cover 20 will be described with reference to FIGS. 13, 14, and 15.

Figure 13:
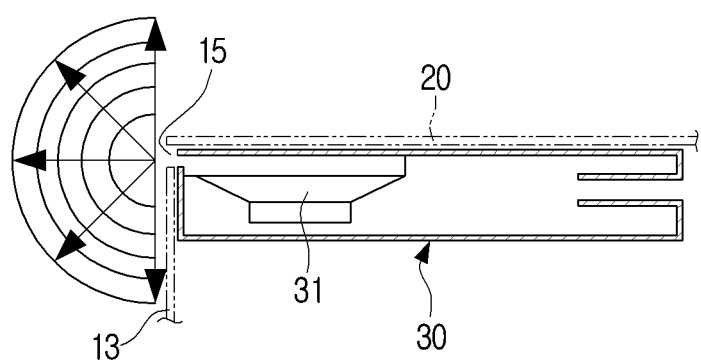
FIG. 13 is a view conceptually illustrating a sound emitting direction and a sound beam width when sound reproduced by a left speaker of a display apparatus according to an embodiment of the disclosure is emitted through an opening of a left cover.

FIG. 13 is a view conceptually illustrating a sound radiation direction and a sound beam width when sound reproduced by a left speaker of a display apparatus according to an embodiment of the disclosure is emitted through an opening of a left cover. FIG. 14 is a view conceptually illustrating a sound radiation direction and a sound beam width when sound reproduced by a left speaker of a display apparatus according to an embodiment of the disclosure is emitted through a rear opening of a rear cover. FIG. 15 is a view conceptually illustrating a sound radiation direction and a sound beam width when sound reproduced by a left speaker of a display apparatus according to an embodiment of the disclosure is emitted through an opening of a left cover and a rear opening of a rear cover.

As illustrated in FIG. 13, when an opening through which the sound reproduced by the left speaker 30 may be emitted is formed as the opening 15 of the left cover 13 and there is no opening in the rear cover 20, sound reproduced by the speaker driver 31 may be widely emitted with the left side of the left speaker 30, that is, the left side of the display apparatus as a central axis. The sound beam width may be determined by the wavelength of the reproduction frequency and the width of the slot. The slot width may be set to ¼ of the wavelength of the high-frequency limit frequency that the left speaker 30 may reproduce, so that the sound beam width has the widest possible range.

Figure 14:
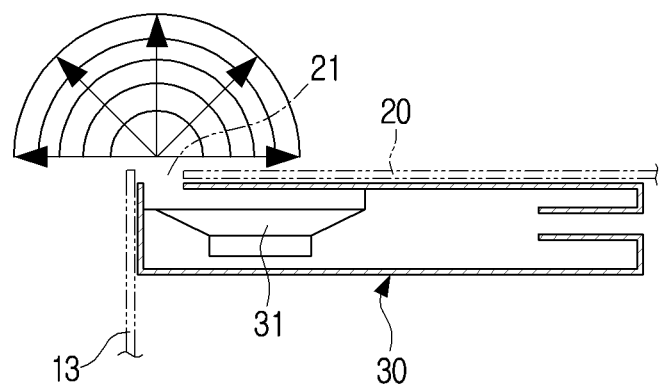
FIG. 14 is a view conceptually illustrating a sound emitting direction and a sound beam width when sound reproduced by a left speaker of a display apparatus according to an embodiment of the disclosure is emitted through a rear opening of a rear cover.

As illustrated in FIG. 14, when an opening through which sound reproduced by the left speaker 30 may be emitted is formed as the rear opening 21 of the rear cover 20 and there is no opening in the left cover 13, the sound reproduced by the speaker driver 31 may be widely emitted with the rear side of the left speaker 30, that is, the rear side of the display apparatus as a central axis. The sound beam width may be determined by the wavelength of the reproduction frequency and the width of the slot. The slot width may be set to ¼ of the wavelength of the high-frequency limit frequency that the left speaker 30 may reproduce, so that the sound beam width has the widest possible range.

Figure 15:
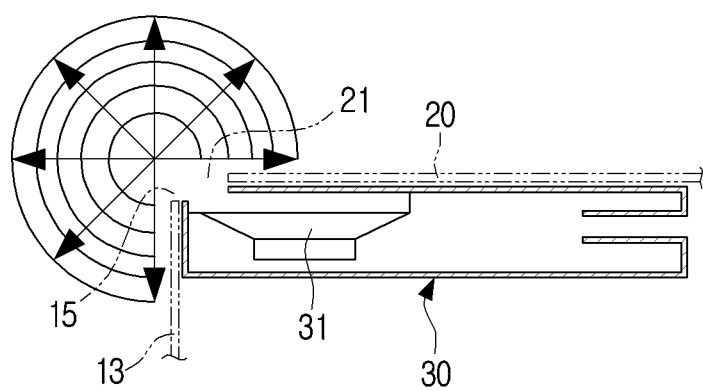
FIG. 15 is a view conceptually illustrating a sound emitting direction and a sound beam width when sound reproduced by a left speaker of a display apparatus according to an embodiment of the disclosure is emitted through an opening of a left cover and a rear opening of a rear cover.

As illustrated in FIG. 15, when an opening through which sound reproduced by the left speaker 30 may be emitted is formed as the opening 15 of the left cover 13 and the rear opening 21 of the rear cover 20, the sound reproduced by the speaker driver 31 may have a horizontal sound directivity characteristic in a wider range than the horizontal sound directivity of the above-described unidirectional opening by combining the left sound directivity of the left speaker 30 and the rear sound directivity of the left speaker 30, that is, by combining the left sound directivity and the rear sound directivity of the display apparatus.

Accordingly, as in the display apparatus 1 according to an embodiment of the disclosure as illustrated in FIGS. 3 and 4, when the opening 15 is formed in the left cover 13 and the rear opening 21 is formed in the rear cover 20, the left speaker 30 may have a wide sound directivity in the horizontal direction.

In addition, when an opening is formed in the right cover 14 and a rear opening 21 is formed in the rear cover 20 to correspond to the right speaker 40, the right speaker 40 may also have a wide sound directivity in the horizontal direction.

Accordingly, because the display apparatus 1 according to an embodiment of the disclosure has a wide horizontal sound directivity, energy in a high frequency band may increase, so that attenuation of the high frequencies may be minimized regardless of a position of a viewer watching the display apparatus 1. Therefore, even when the viewer's position is not in the middle of the display apparatus 1, the viewer may experience a clear high frequency sound without attenuation of the high frequency band.

Figure 16:
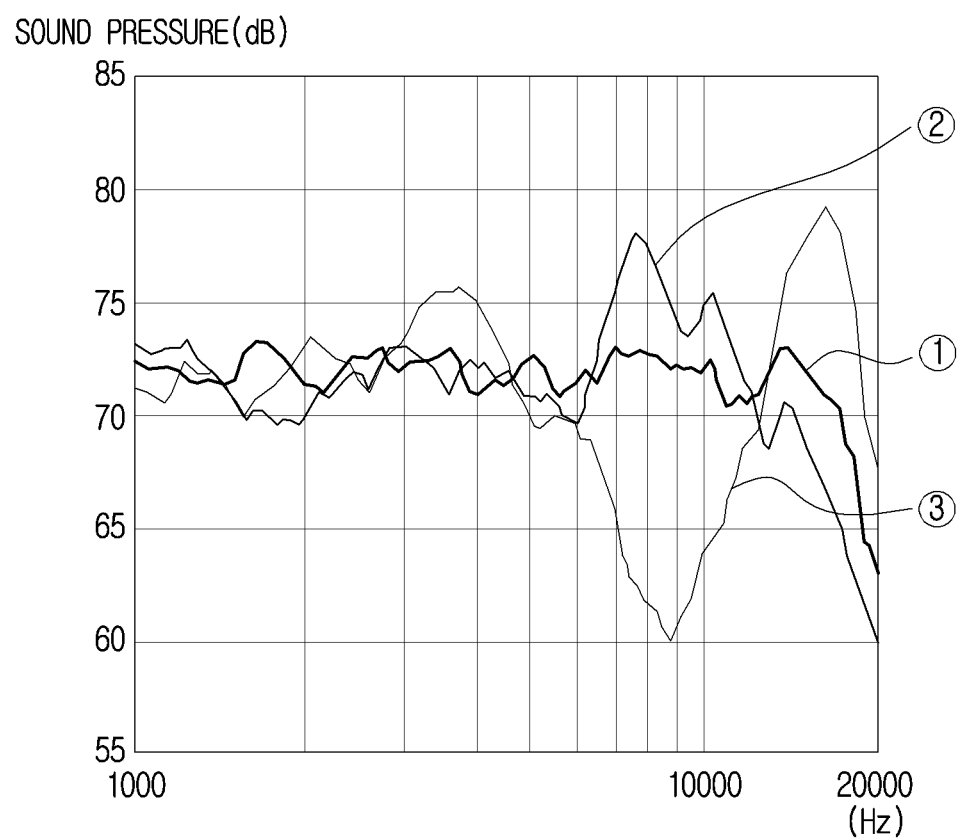
FIG. 16 is a graph illustrating sound pressure levels of sounds emitted from left and right speakers of a display apparatus according to an embodiment of the disclosure.

This effect may be seen from the graph shown in FIG. 16.

FIG. 16 is a graph illustrating sound pressure levels of sounds emitted from left and right speakers of a display apparatus according to an embodiment of the disclosure. For reference, FIG. 16 shows a case in which the sound pressure levels of sounds emitted from the left and right speakers 30 and 40 of the display apparatus 1 are measured when a user is positioned in the middle of the display apparatus 1.

In FIG. 16, the vertical axis represents the sound pressure level (dB), and the horizontal axis represents the frequency (Hz) of sound. In addition, in FIG. 16, line ① indicates a case where sound of the left speaker 30 is emitted through the opening 15 of the left cover 13 and the rear opening 21 of the rear cover 20 and sound of the right speaker 40 is emitted through the opening of the right cover 14 and the rear opening 22 of the rear cover 20 like the display apparatus 1 according to an embodiment of the disclosure. Line ② indicates a case where sounds of the left speaker 30 and the right speaker 40 are emitted only through the rear openings 21 and 22 of the rear cover 20 (see FIG. 13). Line ③ indicates a case where sound of the left speaker 30 is emitted through the opening 15 of the left cover 13 and sound of the right speaker 40 is emitted through the opening of the right cover 14 (see FIG. 12).

Referring to FIG. 16, it can be seen that the left and right speakers 30 and 40 (line ①) of the display apparatus 1 according to an embodiment of the disclosure that emit sound through the side surfaces and the rear surface of the display apparatus 1 has a relatively uniform sound pressure in the high frequency region compared to the left and right speakers (line ③) that emit sound only through the side surfaces and the left and right speakers (line ②) that emit sound only through the rear surface. Accordingly, in the display apparatus 1 according to an embodiment of the disclosure, because high-frequency energy is improved in the front thereof, high-frequency clarity may be obtained.

In addition, the sound radiation direction and sound beam width of the sound reproduced by each of the upper left speaker 60 and the upper right speaker 70 may be controlled by the upper openings 17 and 18 formed in the upper cover 11 and the upper rear openings 23 and 24 formed in the rear cover 20.

Hereinafter, a manner in which a sound radiation direction and a sound beam width of sound reproduced by the upper left speaker 60 are adjusted by the upper opening 17 of the upper cover 11 and the upper rear opening 23 of the rear cover 20 will be described with reference to FIGS. 17 and 18.

Figure 17:
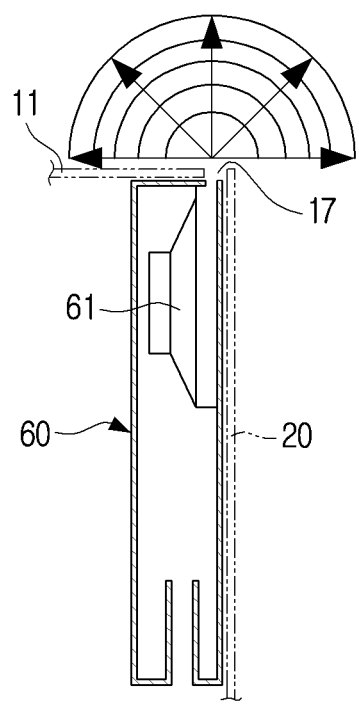
FIG. 17 is a view conceptually illustrating a sound emitting direction and a sound beam width when sound reproduced by an upper left speaker of a display apparatus according to an embodiment of the disclosure is emitted through an upper opening of an upper cover.

FIG. 17 is a view conceptually illustrating a sound radiation direction and a sound beam width when sound reproduced by an upper left speaker of a display apparatus according to an embodiment of the disclosure is emitted through an upper opening of an upper cover. FIG. 18 is a view conceptually illustrating a sound radiation direction and a sound beam width when sound reproduced by an upper left speaker of a display apparatus according to an embodiment of the disclosure is emitted through an upper opening provided in an upper cover and a rear opening provided in a rear cover.

As illustrated in FIG. 17, when an opening through which sound reproduced by the upper left speaker 60 may be emitted is formed as the upper opening 17 of the upper cover 11 and there is no opening in the rear cover 20, the sound reproduced by the upper speaker driver 61 may be widely emitted with the upper side of the upper left speaker 60, that is, the upper side of the display apparatus as a central axis. The sound beam width may be determined by the wavelength of the reproduction frequency and the width of the slot. The slot width may be set to ¼ of the wavelength of the high-frequency limit frequency that the upper left speaker 60 may reproduce, so that the sound beam width has the widest possible range.

Figure 18:
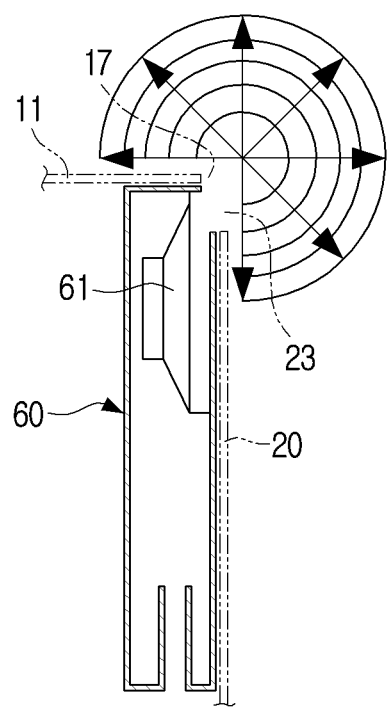
FIG. 18 is a view conceptually illustrating a sound emitting direction and a sound beam width when sound reproduced by an upper left speaker of a display apparatus according to an embodiment of the disclosure is emitted through an upper opening provided in an upper cover and a rear opening provided in a rear cover.

As illustrated in FIG. 18, when an opening through which sound reproduced by the upper left speaker 60 may be emitted is formed as the upper opening 17 of the upper cover 11 and the upper rear opening 23 of the rear cover 20, the sound reproduced by the upper speaker driver 61 may have a vertical sound directivity characteristic in a wider range than the vertical sound directivity of the above-described unidirectional opening by combining the upward sound directivity of the upper left speaker 60 and the rear sound directivity of the upper left speaker 60, that is, by combining the upward sound directivity and the rear sound directivity of the display apparatus.

Therefore, like the display apparatus 1 according to an embodiment of the disclosure as illustrated in FIGS. 3 and 4, when the upper opening 17 is formed in the upper cover 11 and the upper rear opening 23 is formed in the rear cover 20, the upper left speaker 60 may have a wide sound directivity in the vertical direction.

Further, when an upper opening 18 corresponding to the upper right speaker 70 is formed in the upper cover 11 and an upper rear opening 24 corresponding to the upper right speaker 70 is formed in the rear cover 20, the upper right speaker 70 may also have a wide sound directivity in the vertical direction. Accordingly, because the display apparatus 1 according to an embodiment of the disclosure has a wide vertical sound directivity, a sense of vertical presence may be improved.

In addition, when the woofer openings 25 and 27 corresponding to the diaphragms 82 and 92 of the woofer speakers 80 and 90 are formed in the rear cover 20 like the display apparatus 1 according to an embodiment of the disclosure, the excursion at which the diaphragms 82 and 92 of the woofer speakers 80 and 90 vibrate may be increased while reducing the thickness of the display apparatus 1. When the excursion of the woofer speakers 80 and 90 is large, the sound pressure level of the sound that the woofer speakers 80 and 90 may reproduce increases. This will be described with reference to FIGS. 19 and 20.

Figure 19:
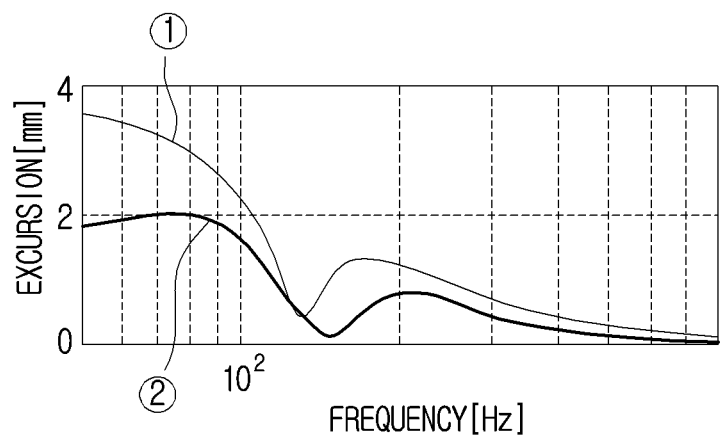
FIG. 19 is a graph comparing excursion of a woofer speaker of a display apparatus according to an embodiment of the disclosure and excursion of a woofer speaker of a conventional display apparatus.

FIG. 19 is a graph comparing excursion of a woofer speaker of a display apparatus according to an embodiment of the disclosure and excursion of a woofer speaker of a conventional display apparatus.

In FIG. 19, the vertical axis represents the excursion (mm) of the diaphragm of the woofer speaker, and the horizontal axis represents the frequency (Hz). In addition, in FIG. 19, line ① indicates a case where the woofer opening corresponding to the diaphragm of the woofer speaker is formed in the rear cover like the display apparatus according to an embodiment of the disclosure. Line ② indicates a case where there is no woofer opening in the rear cover like the conventional display apparatus.

Referring to FIG. 19, it can be seen that in the low frequency band, the excursion (line ①) of the diaphragm of the woofer speaker of the display apparatus according to an embodiment of the disclosure having a woofer opening is larger than the excursion (line ②) of the diaphragm of the woofer speaker of the conventional display apparatus without a woofer opening.

Figure 20:
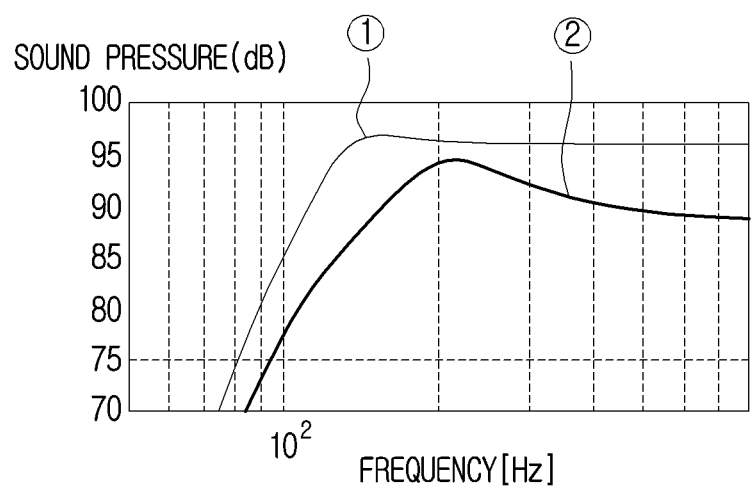
FIG. 20 is a graph comparing a sound pressure level of a woofer speaker of a display apparatus according to an embodiment of the disclosure and a sound pressure level of a woofer speaker of a conventional display apparatus.

FIG. 20 is a graph comparing a sound pressure level of a woofer speaker of a display apparatus according to an embodiment of the disclosure and a sound pressure level of a woofer speaker of a conventional display apparatus.

In FIG. 20, the vertical axis represents the sound pressure level (dB) of the woofer speaker, and the horizontal axis represents the frequency (Hz). In addition, in FIG. 20, line ① indicates a case where the woofer opening corresponding to the diaphragm of the woofer speaker is formed in the rear cover like the display apparatus according to an embodiment of the disclosure. Line ② indicates a case where there is no woofer opening in the rear cover like the conventional display apparatus.

Referring to FIG. 20, it can be seen that in the low frequency band, the sound pressure level (line ①) of the woofer speaker of the display apparatus according to an embodiment of the disclosure having a woofer opening is greater than the sound pressure level (line ②) of the woofer speaker of the conventional display apparatus without a woofer opening.

As described above, in the display apparatus 1 according to an embodiment of the disclosure, because the woofer openings 25 and 27 corresponding to the diaphragms 82 and 92 of the woofer speakers 80 and 90 are provided in the rear cover 20, a low-frequency volume and a low-frequency reproduction band may be increased compared to the conventional display apparatus while reducing the thickness of the display apparatus 1.

Hereinabove, the disclosure has been described as an illustrative method. It is to be understood that terms used herein are provided to describe the disclosure rather than limiting the disclosure. Various modifications and alternations of the disclosure may be made according to the contents described above. Therefore, the disclosure may be freely practiced without departing from the scope of the claims unless additionally mentioned.

What is claimed is:

1. A display apparatus comprising:
a rear cover disposed behind a display panel and formed to cover a rear surface of the display panel;
a left cover disposed on a left side of the display panel and connected to the rear cover and a right cover disposed on a right side of the display panel and connected to the rear cover; and
a left speaker disposed adjacent to the left cover and a right speaker disposed adjacent to the right cover,
wherein each of the left speaker and the right speaker comprises,
a diaphragm facing the rear cover and spaced apart from the rear cover to form a slot;
an enclosure surrounding a speaker driver;
a sound discharge port provided at one end of the slot adjacent to the left cover or the right cover and through which sound reproduced by the diaphragm is discharged; and
a side wall disposed between one surface of the enclosure and the rear cover and configured to surround a circumference of the diaphragm excluding the sound discharge port.

2. The display apparatus as claimed in claim 1, wherein each of the left cover and the right cover includes an opening that is formed at a portion facing the sound discharge port and has a length and a width.

3. The display apparatus as claimed in claim 2, wherein the opening is formed as a plurality of holes.

4. The display apparatus as claimed in claim 2, wherein the rear cover comprises a rear opening that is formed at a portion corresponding to the sound discharge port, is adjacent to the left cover or the right cover, and has a length in a vertical direction and a width in a horizontal direction.

5. The display apparatus as claimed in claim 4, wherein the rear opening is formed as a plurality of holes.

6. The display apparatus as claimed in claim 1, wherein each of the left speaker and the right speaker further comprises a sound absorbing member disposed on the side wall.

7. The display apparatus as claimed in claim 1, wherein each of the left speaker and the right speaker comprises a full-range speaker.

8. The display apparatus as claimed in claim 1, wherein each of the left speaker and the right speaker comprises a mid-range speaker and a tweeter.

9. The display apparatus as claimed in claim 1, further comprising:
a woofer speaker disposed between the rear cover and the display panel, wherein the rear cover includes a woofer opening through which a diaphragm of the woofer speaker is exposed.

10. The display apparatus as claimed in claim 9, further comprising:
at least one passive radiator provided at one side of the woofer speaker,
wherein the rear cover further includes at least one radiator opening corresponding to the at least one passive radiator.

11. The display apparatus as claimed in claim 9, wherein the woofer speaker comprises a left woofer speaker disposed close to the left cover and a right woofer speaker disposed close to the right cover, and
wherein each of the left woofer speaker and the right woofer speaker includes at least one passive radiator.

12. The display apparatus as claimed in claim 1, further comprising:
an upper cover disposed above the display panel and connected to the rear cover; and
an upper left speaker and an upper right speaker disposed under the upper cover and spaced apart from each other in a horizontal direction,
wherein the upper cover includes two upper openings through which sounds reproduced by the upper left speaker and the upper right speaker are discharged.

13. The display apparatus as claimed in claim 12, wherein each of the upper left speaker and the upper right speaker comprises,
- a diaphragm facing the rear cover and spaced apart from the rear cover to form a slot;
- an upper enclosure surrounding an upper speaker driver;
- an upper sound discharge port provided to face the upper opening at one end of the slot adjacent to the upper cover and through which sound reproduced by the diaphragm is discharged; and
- an upper side wall disposed between one surface of the upper enclosure and the rear cover and configured to surround a circumference of the diaphragm excluding the upper sound discharge port.

14. The display apparatus as claimed in claim 13, wherein the rear cover includes upper rear openings formed at portions of the rear cover corresponding to the upper sound discharge ports of the upper left speaker and the upper right speaker.

15. The display apparatus as claimed in claim 1, further comprising:
- a front cover configured to support the display panel,
- wherein the left cover and the right cover are formed integrally with the front cover.

16. A display apparatus comprising:
- a rear cover disposed behind a display panel and formed to cover a rear surface of the display panel;
- a left cover disposed on a left side of the display panel and connected to the rear cover and a right cover disposed on a right side of the display panel and connected to the rear cover;
- a left speaker disposed adjacent to the left cover and a right speaker disposed adjacent to the right cover;
- an upper cover disposed above the display panel and connected to the rear cover; and
- an upper left speaker and an upper right speaker disposed under the upper cover, wherein each of the left speaker, the right speaker, the upper left speaker, and the upper right speaker comprises,
- a diaphragm facing the rear cover and spaced apart from the rear cover by a predetermined distance to form a slot;
- an enclosure surrounding a speaker driver;
- a sound discharge port provided at one end of the slot and through which sound reproduced by the diaphragm is discharged; and
- a side wall disposed between one surface of the enclosure and the rear cover and configured to surround a circumference of the diaphragm excluding the sound discharge port.

17. The display apparatus as claimed in claim 16, further comprising:
- a woofer speaker disposed between the rear cover and the display panel, wherein the rear cover includes a woofer opening through which a diaphragm of the woofer speaker is exposed.

* * * * *